United States Patent
Stockhammer et al.

(10) Patent No.: US 10,693,936 B2
(45) Date of Patent: Jun. 23, 2020

(54) TRANSPORTING CODED AUDIO DATA

(71) Applicant: QUALCOMM Incorporated, San Diego, CA (US)

(72) Inventors: Thomas Stockhammer, Bergen (DE); Dipanjan Sen, San Diego, CA (US); Nils Günther Peters, San Diego, CA (US); Moo Young Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 574 days.

(21) Appl. No.: 15/246,370

(22) Filed: Aug. 24, 2016

(65) Prior Publication Data

US 2017/0063960 A1    Mar. 2, 2017

Related U.S. Application Data

(60) Provisional application No. 62/209,779, filed on Aug. 25, 2015, provisional application No. 62/209,764, filed on Aug. 25, 2015.

(51) Int. Cl.
  *G06F 15/16*    (2006.01)
  *H04L 29/06*    (2006.01)
  (Continued)

(52) U.S. Cl.
  CPC ............ *H04L 65/607* (2013.01); *H04L 67/02* (2013.01); *H04N 21/44209* (2013.01);
  (Continued)

(58) Field of Classification Search
  None
  See application file for complete search history.

(56) References Cited

U.S. PATENT DOCUMENTS 8,315,396 B2    11/2012   Schreiner et al.
9,478,228 B2    10/2016   Oomen et al.
(Continued)

FOREIGN PATENT DOCUMENTS

CN    102100088 A    6/2011
CN    104428835 A    3/2015
WO    2017096023 A    6/2017

OTHER PUBLICATIONS

International Preliminary Report on Patentability issued in International Application No. PCT/US2016/048740 dated Nov. 10, 2017, 14 pp.
(Continued)

*Primary Examiner* — Mohamed Ibrahim
(74) *Attorney, Agent, or Firm* — Shumaker & Sieffert, P.A./Qualcomm Incorporated

(57) ABSTRACT

In one example, a device for retrieving audio data includes one or more processors configured to receive availability data representative of a plurality of available adaptation sets, the available adaptation sets including a scene-based audio adaptation set and one or more object-based audio adaptation sets, receive selection data identifying which of the scene-based audio adaptation set and the one or more object-based audio adaptation sets are to be retrieved, and provide instruction data to a streaming client to cause the streaming client to retrieve data for each of the adaptation sets identified by the selection data, and a memory configured to store the retrieved data for the audio adaptation sets.

35 Claims, 26 Drawing Sheets

(51) Int. Cl.
*H04L 29/08* (2006.01)
*H04N 21/81* (2011.01)
*H04N 21/845* (2011.01)
*H04N 21/6373* (2011.01)
*H04N 21/462* (2011.01)
*H04N 21/442* (2011.01)

(52) U.S. Cl.
CPC ..... *H04N 21/4621* (2013.01); *H04N 21/6373* (2013.01); *H04N 21/8106* (2013.01); *H04N 21/845* (2013.01); *H04L 67/42* (2013.01)

(56) References Cited

U.S. PATENT DOCUMENTS

| | | | |
|---|---|---|---|
| 9,854,375 | B2 | 12/2017 | Stockhammer |
| 2004/0172478 | A1 | 9/2004 | Jacobs et al. |
| 2007/0291837 | A1* | 12/2007 | Eleftheriadis .. H04N 21/234327 375/240.02 |
| 2011/0238789 | A1 | 9/2011 | Luby et al. |
| 2012/0042050 | A1 | 2/2012 | Chen et al. |
| 2013/0060956 | A1* | 3/2013 | Nagaraj ............. H04N 21/4384 709/231 |
| 2014/0019587 | A1* | 1/2014 | Giladi ............... H04L 29/06476 709/217 |
| 2014/0026052 | A1 | 1/2014 | Thorwirth et al. |
| 2014/0289371 | A1* | 9/2014 | Moore .................. H04L 65/607 709/219 |
| 2015/0142453 | A1 | 5/2015 | Oomen et al. |
| 2015/0199498 | A1* | 7/2015 | Liu ......................... G06F 21/10 713/167 |
| 2015/0304665 | A1* | 10/2015 | Hannuksela ........... H04N 19/70 375/240.02 |

OTHER PUBLICATIONS

International Search Report and Written Opinion—PCT/US2016/048740—ISA/EPO—dated Mar. 20, 2017—25 pp.
Ralf Gieger, et al., "ISO/IEC MPEG-4 High-Definition Scalable Advanced Audio Coding", AES Convention 120, May 2006, AES, 60 East 42nd Street, Room 2520, New York, 10165-2520, USA, May 1, 2006 (May 1, 2006), XP040507685, 20 pages.
Response to Written Opinion filed in international application No. PCT/US2016/048740 dated Jun. 23, 2017, 5 pp.
3GPP Draft; DASH-IF-LIVE-V0.9, 3rd Generation Partnership Project (3GPP), Mobile Competence Centre ; 650, Route Des Lucioles ; F-06921 Sophia-Antipolis Cedex ; France, Aug. 24, 2014, section 2.3, p. 10, Retrieved from the Internet on Jan. 28, 2015 from URL:http://www.3gpp.org/ftp/Meetings_3GPP_SYNC/SA4/Docs/, 60 pp.
Krauss et al., "Exploration of Multi-stream DASH Delivery of Audio, Including MPEG-H 3D Audio," MPEG Meeting; Oct. 19-23, 2015; Geneva; Motion Picture Expert Group or ISO/IEC JTC1/SC29/WG11, No. N15687, Oct. 23, 2015, 32 pp.
Herre et al., "MPEG-H 3D Audio—The New Standard for Coding of Immersive Spatial Audio," IEEE Journal of Selected Topics in Signal Processing, Aug. 1, 2015, vol. 9(5), pp. 770-779, US ISSN: 1932-4553, DOI: 10.1109/JSTSP. 2015.2411578, 10 pp.
Herre et al., "Overview of MPEG-4 audio and its Applications in Mobile Communications," Proceedings of the International Conference on Signal Processing, Jan. 1, 2000, vol. 1, pp. 11-20, p. 17, section 8.1, 10 pp.
Hofmann et al., "Proposal for MPD Signaling for Multi-Stream Audio," MPEG Meeting; Oct. 19-23, 2015; Geneva; Motion Picture Expert Group or ISO/IEC JTC1/SC29/WG11, No. m37191, Oct. 14, 2015, 7 pp.
Invitation to Restrict or Pay Additional Fees from International Application No. PCT/US2016/048740, dated Nov. 23, 2016, 9 pp.
"Text of ISO/IEC 14996-15:2013 PDAM 1 Carriage of Layered HEVC," International Organization for Standardization, ISO/IEC JTC1/SC29/WG11, Coding of Moving Pictures and Audio, MPEG/N14727, Sapporo, Japan, Jul. 2014, 35 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 12) 3GPP TS 26.247, V12.1.0, Dec. 2013, 118 pp.
"Text of ISO/IEC 13818-1:2013 PDAM 7 Carriage of Layered HEVC", MPEG Meeting; Mar. 31-Apr. 4, 2014; Valencia; Motion Picture Expert Group or ISO/IEC JTC1/SC29/WG11, No. N14319, May 8, 2014, 28 pp.
Text of ISO/IEC 13818-1 :2015/FDAM 2 Carriage of Layered HEVC, Jun. 2015; ISO/IEC JTC1/SC29/WG11 MPEG112/N15468, 24 pp.
Paila et al., "FLUTE—File Delivery over Unidirectional Transport," Internet Engineering Task Force (IETF), Standards Track, RFC 6726, Nov. 2012, Retrieved from https://tools.ietf.org/html/rfc6726 on Feb. 23, 2017, 47 pp.
Fielding et al., "Hypertext Transfer Protocol—HTTP/1.1," Network Working Group, Standards Track, RFC 2616, Jun. 1999, Retrieved from https://tools.ietf.org/html/rfc2616 on Feb. 23, 2017, 177 pp.
"Information technology—Coding of audio-visual objects—Part 12: ISO base media file format," International Standard ISO/IEC 14496-12:2012, Technical Corrigendum 4, Jul. 1, 2015, ICS 35.040, Ref. No. ISO/IEC 14496-12:2012/Cor.4:2015(E), 2 pp.
"Information technology—Dynamic adaptive streaming over HTTP (DASH)—Part 1: Media presentation description and segment formats," International Standard ISO/IEC 23009-1; Second edition, May 15, 2014, ISO/IEC 23009-1:2014(E); 152 pp.
U.S. Appl. No. 62/145,960, filed Apr. 10, 2015.
Partial Search Report issued by the International Searching Authority of the European Patent Organization in International Application No. PCT/US2016/048740 dated Nov. 23, 2016, 9 pp.
EBU: "Digital Audio Compression (AC-4) Standard", ETSI TS 103 190 V1.1.1 (Apr. 2014), DTS/JTC-025, ETSI, 650, Route des Lucioles, F-06921, Sophia Antipolis Cedex, France, Apr. 1, 2014, XP055228097, pp. 1-295. Retrieved from the Internet: URL: http://www.etsi.org/deliver/etsi_ts/103100_103199/103190/01.01.01_60/ts_103190v010101p. pdf.

\* cited by examiner

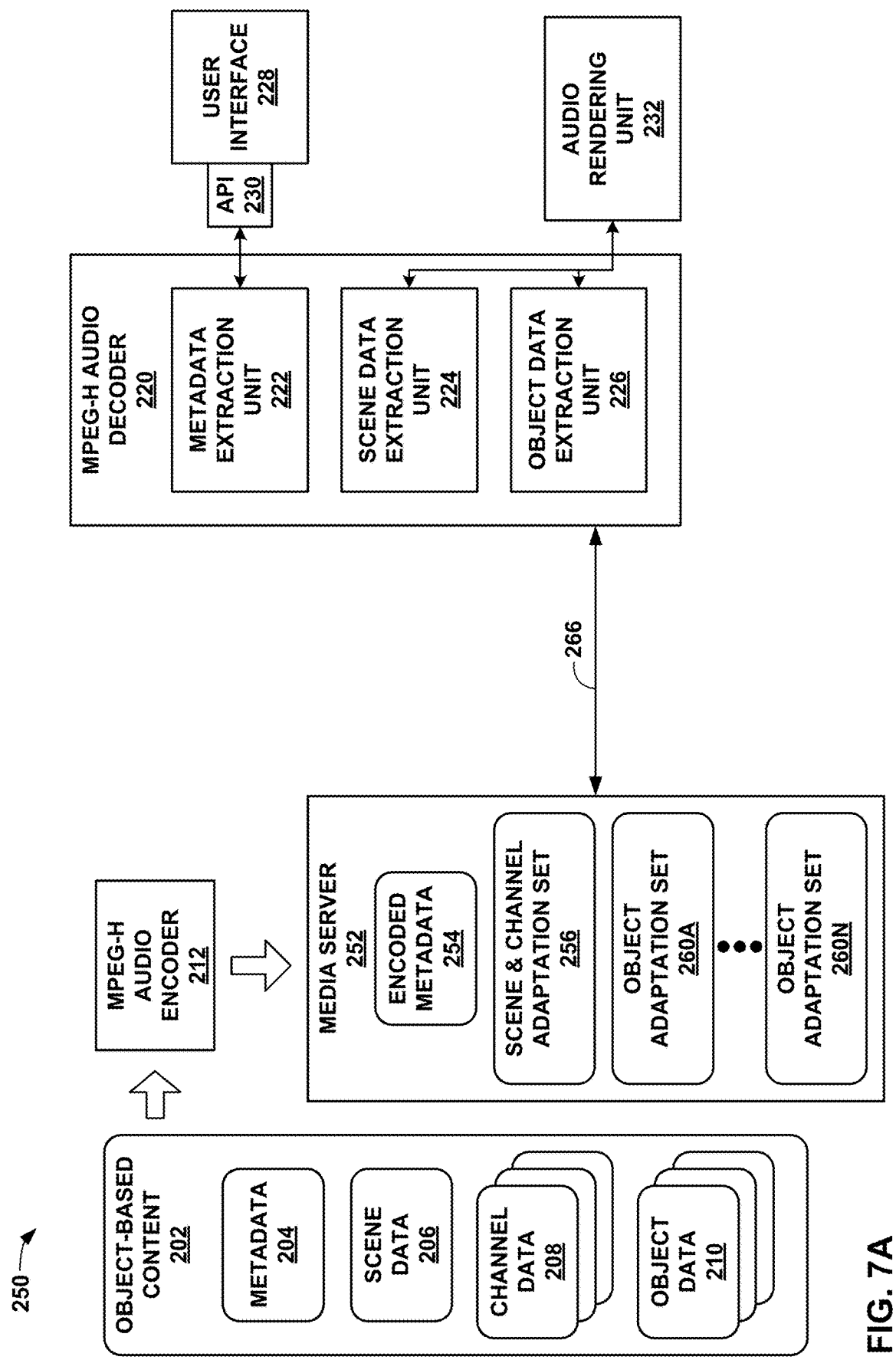

TRANSPORTING CODED AUDIO DATA

This application claims the benefit of U.S. Provisional Application No. 62/209,779, filed Aug. 25, 2015, and U.S. Provisional Application No. 62/209,764, filed Aug. 25, 2015, the entire contents of each of which are hereby incorporated by reference.

TECHNICAL FIELD

This disclosure relates to storage and transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265/High Efficiency Video Coding (HEVC), and extensions of such standards, to transmit and receive digital video information more efficiently.

A higher-order ambisonics (HOA) signal (often represented by a plurality of spherical harmonic coefficients (SHCs) or other hierarchical elements) is a three-dimensional representation of a soundfield. The HOA or SHC representation may represent the soundfield in a manner that is independent of the local speaker geometry used to playback a multi-channel audio signal rendered from the SHC signal.

After media data, such as audio or video data, has been encoded, the media data may be packetized for transmission or storage. The media data may be assembled into a media file conforming to any of a variety of standards, such as the International Organization for Standardization (ISO) base media file format and extensions thereof.

SUMMARY

In general, this disclosure describes techniques for transporting three-dimensional (3D) audio data using streaming media transport technologies, such as Dynamic Adaptive Streaming over HTTP (DASH). The 3D audio data may include, for example, one or more HOA signals and/or one or more sets of spherical harmonic coefficients (SHCs). In particular, in accordance with the techniques of this disclosure, various types of audio data may be provided in distinct adaptation sets, e.g., according to DASH. For example, a first adaptation set may include scene audio data, a first set of adaptation sets may include channel audio data, and a second set of adaptation sets may include object audio data. The scene audio data may generally correspond to background noise. The channel audio data may generally correspond to audio data dedicated to particular channels (e.g., for specific, corresponding speakers). The object audio data may correspond to audio data recorded from objects that produce sounds in a three-dimensional space. For example, an object may correspond to a musical instrument, a person who is speaking, or other sound-producing real-world objects.

Availability data may be used to indicate adaptation sets that include each of the types of audio data, where the availability data may be formatted according to, e.g., an MPEG-H 3D Audio data format. Thus, a dedicated processing unit, such as an MPEG-H 3D Audio decoder, may be used to decode the availability data. Selection data (e.g., user input or pre-configured data) may be used to select which of the types of audio data are to be retrieved. Then, a streaming client (such as a DASH client) may be instructed to retrieve data for the selected adaptation sets.

In one example, a method of retrieving audio data includes receiving availability data representative of a plurality of available adaptation sets, the available adaptation sets including a scene-based audio adaptation set and one or more object-based audio adaptation sets, receiving selection data identifying which of the scene-based audio adaptation set and the one or more object-based audio adaptation sets are to be retrieved, and providing instruction data to a streaming client to cause the streaming client to retrieve data for each of the adaptation sets identified by the selection data.

In another example, a device for retrieving audio data includes one or more processors configured to receive availability data representative of a plurality of available adaptation sets, the available adaptation sets including a scene-based audio adaptation set and one or more object-based audio adaptation sets, receive selection data identifying which of the scene-based audio adaptation set and the one or more object-based audio adaptation sets are to be retrieved, and provide instruction data to a streaming client to cause the streaming client to retrieve data for each of the adaptation sets identified by the selection data; and a memory configured to store the retrieved data for the audio adaptation sets.

In another example, a device for retrieving audio data includes means for receiving availability data representative of a plurality of available adaptation sets, the available adaptation sets including a scene-based audio adaptation set and one or more object-based audio adaptation sets, means for receiving selection data identifying which of the scene-based audio adaptation set and the one or more object-based audio adaptation sets are to be retrieved, and means for providing instruction data to a streaming client to cause the streaming client to retrieve data for each of the adaptation sets identified by the selection data.

In another example, a non-transitory computer-readable storage medium has stored thereon instructions that, when executed, cause a processor to receive availability data representative of a plurality of available adaptation sets, the available adaptation sets including a scene-based audio adaptation set and one or more object-based audio adaptation sets, receive selection data identifying which of the scene-based audio adaptation set and the one or more object-based audio adaptation sets are to be retrieved, and provide instruction data to a streaming client to cause the streaming client to retrieve data for each of the adaptation sets identified by the selection data.

The details of one or more examples are set forth in the accompanying drawings and the description below. Other features, objects, and advantages will be apparent from the description and drawings, and from the claims.

BRIEF DESCRIPTION OF DRAWINGS

FIGS. 7A-7C are block diagrams illustrating another example system in accordance with the techniques of this disclosure.

DETAILED DESCRIPTION

Figure 1:
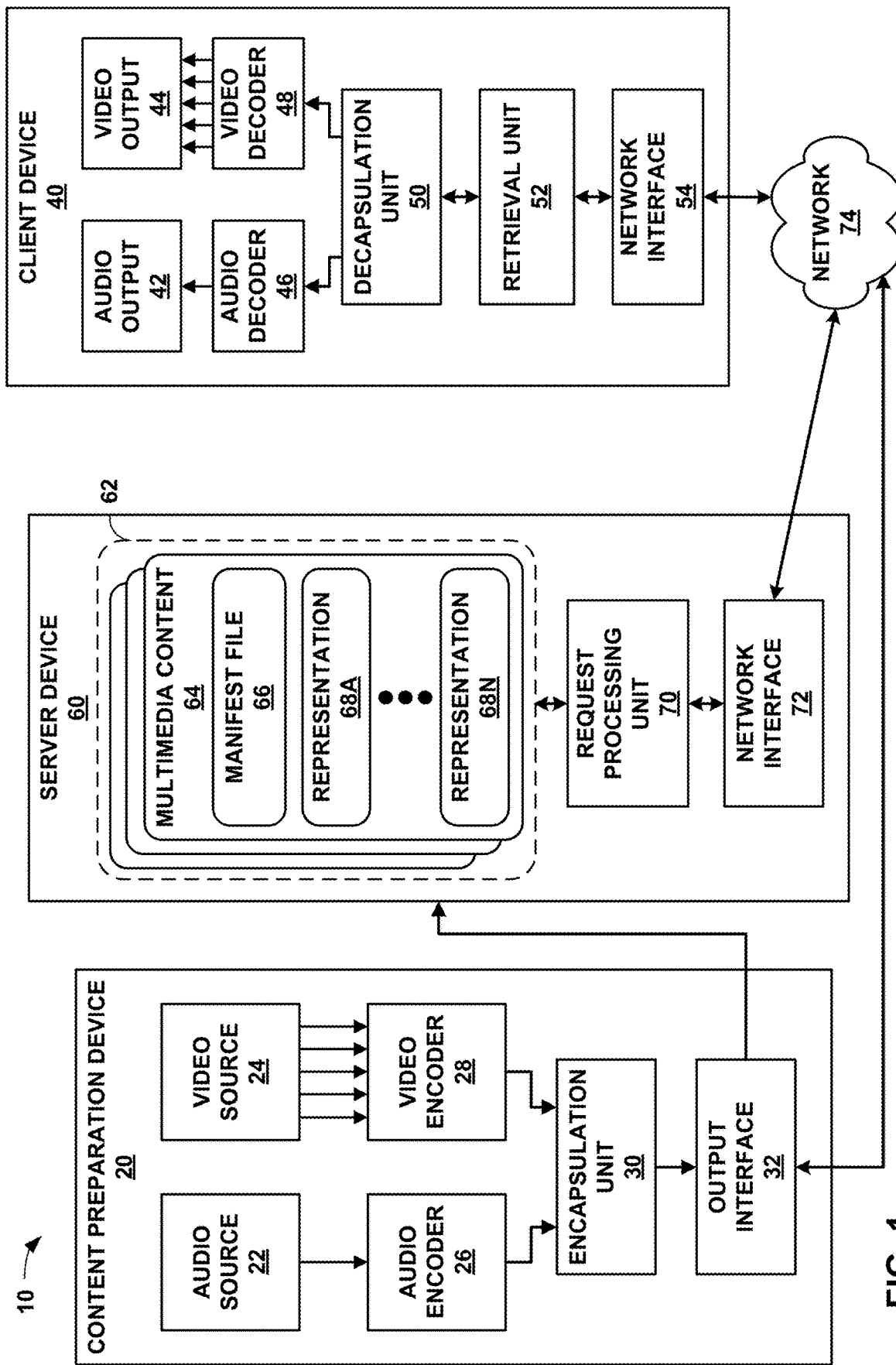
FIG. 1 is a block diagram illustrating an example system that implements techniques for streaming media data over a network.

In general, this disclosure describes techniques for transporting encoded media data, such as encoded three-dimensional (3D) audio data. The evolution of surround sound has made available many output formats for entertainment. Examples of such consumer surround sound formats are mostly 'channel' based in that they implicitly specify feeds to loudspeakers in certain geometrical coordinates. The consumer surround sound formats include the popular 5.1 format (which includes the following six channels: front left (FL), front right (FR), center or front center, back left or surround left, back right or surround right, and low frequency effects (LFE)), the growing 7.1 format, and various formats that includes height speakers such as the 7.1.4 format and the 22.2 format (e.g., for use with the Ultra High Definition Television standard). Non-consumer formats can span any number of speakers (in symmetric and non-symmetric geometries) often termed 'surround arrays'. One example of such an array includes 32 loudspeakers positioned on coordinates on the corners of a truncated icosahedron.

The input to a future MPEG-H encoder is optionally one of three possible formats: (i) traditional channel-based audio (as discussed above), which is meant to be played through loudspeakers at pre-specified positions; (ii) object-based audio, which involves discrete pulse-code-modulation (PCM) data for single audio objects with associated metadata containing their location coordinates (amongst other information); and (iii) scene-based audio, which involves representing the soundfield using coefficients of spherical harmonic basis functions (also called "spherical harmonic coefficients" or SHC, "Higher-order Ambisonics" or HOA, and "HOA coefficients"). An example MPEG-H encoder is described in more detail in MPEG-H 3D Audio—The New Standard forCoding of Immersive Spatial Audio, Jurgen Herre, Senior Member, IEEE, Johannes Hilpert, Achim Kuntz, and Jan Plogsties, IEEE JOURNAL OF SELECTED TOPICS IN SIGNAL PROCESSING, VOL. 9, NO. 5, AUGUST 2015.

The new MPEG-H 3D Audio standard provides for standardized audio bitstreams for each of the channel, object, and SCE based audio streams, and a subsequent decoding that is adaptable and agnostic to the speaker geometry (and number of speakers) and acoustic conditions at the location of the playback (involving a renderer).

As pointed out in the IEEE paper (pg. 771), HOA provides more coefficient signals, and thus, an increased spatial selectivity, which allows to render loudspeaker signals with less crosstalk, resulting in reduced timbral artifacts. In contrast to objects, spatial information in HOA is not conveyed in explicit geometric metadata, but in the coefficient signals themselves. Thus, Ambisonics/HOA is not that well suited to allow access to individual objects in a sound scene. However, there is more flexibility for content creators, using a hierarchical set of elements to represent a soundfield. The hierarchical set of elements may refer to a set of elements in which the elements are ordered such that a basic set of lower-ordered elements provides a full representation of the modeled soundfield. As the set is extended to include higher-order elements, the representation becomes more detailed, increasing resolution.

One example of a hierarchical set of elements is a set of spherical harmonic coefficients (SHC). The following expression demonstrates a description or representation of a soundfield using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the soundfield, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\bullet)$ is the spherical Bessel function of order n, and $Y_n^m(\theta_r, \varphi_r)$ are the spherical harmonic basis functions of order n and suborder m. It can be recognized that the term in square brackets is a frequency-domain representation of the signal (i.e., $S(\omega, r_r, \theta_r,$ φ_r)) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

The techniques of this disclosure may be used to transport audio data that was encoded as discussed above using a streaming protocol, such as Dynamic Adaptive Streaming over HTTP (DASH). Various aspects of DASH are described in, e.g., "Information Technology-Dynamic Adaptive Streaming over HTTP (DASH)—Part 1: Media Presentation Description and Segment Formats," ISO/IEC 23089-1, Apr. 1, 2012; and 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 12) 3GPP TS 26.247, V12.1.0, December 2013.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content.

As explained below, different representations may correspond to different forms of scalable coding for HoA, i.e. scene based audio.

The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. As another example, representations of an audio adaptation set may include the same type of audio data, encoded at different bitrates to support bandwidth adaptation. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select a video adaptation set including video representations, an adaptation set including audio representations, and/or an adaptation set including timed text.

The techniques of this disclosure may be used to multiplex media (e.g., 3D audio) data into, e.g., MPEG-2 Systems, described in "Information technology—Generic coding of moving pictures and associated audio information—Part 1: Systems," ISO/IEC 13818-1:2013 (also ISO/IEC 13818-1:2015). The Systems specification describes streams/tracks with access units, each with a time stamp. Access units are multiplexed and there is typically some flexibility on how this multiplexing can be performed. MPEG-H audio permits samples of all objects to be placed in one stream, e.g., all samples with the same time code may be mapped into one access unit. At the system level, it is possible to generate one master stream and multiple supplementary streams that allow separation of the objects into different system streams. System streams create flexibility: they allow for different delivery path, for hybrid delivery, for not delivering one at all, and the like.

Files that include media data, e.g., audio and/or video data, may be formed according to the ISO Base Media File Format (BMFF), described in, e.g., "Information technology—Coding of audio-visual objects—Part 12: ISO base media file format," ISO/IEC 14496-12:2012. In ISO BMFF, streams are tracks—the access units are contained in a movie data (mdat) box. Each track gets a sample entry in the movie header and sample table describing the samples can physically be found. Distributed storage is also possible by using movie fragments.

In MPEG-2 Transport Stream (TS), streams are elementary streams. There is less flexibility in MPEG-2 TS, but in general the techniques are similar to ISO BMFF. Although files containing media data (e.g., encoded 3D audio data) may be formed according to any of the various techniques discussed above, this disclosure describes techniques with respect to ISO BMFF/file format. Accordingly, 3D audio data (e.g., scene audio data, object audio data, and/or channel audio data) may be encoded according to MPEG-H 3D Audio and encapsulated according to, e.g., ISO BMFF. Similarly, availability data may be encoded according to MPEG-H 3D Audio. Thus, a unit or device separate from a DASH client (such as an MPEG-H 3D Audio decoder) may decode the availability data and determine which of the adaptation sets are to be retrieved, then send instruction data to the DASH client to cause the DASH client to retrieve data for the selected adaptation sets.

In general, files may contain encoded media data, such as encoded 3D audio data. In DASH, such files may be referred to as "segments" of a representation, as discussed above. Furthermore, a content provider may provide media content using various adaptation sets, as noted above. With respect to 3D audio data, the scene audio data may be offered in one adaptation set. This adaptation set may include a variety of switchable (that is, alternative) representations for the scene audio data (e.g., differing from each other in bitrate, but otherwise being substantially the same). Similarly, audio objects may each be offered in a respective adaptation set. Alternatively, an adaptation set may include multiple audio objects, and/or one or more audio objects may be offered in multiple adaptation sets.

In accordance with the techniques of this disclosure, a client device (e.g., user equipment, "UE") may include an MPEG-H audio decoder or other unit configured to decode and parse audio metadata (which may be formatted according to the MPEG-H 3D Audio standard). The audio metadata may include a description of available adaptation sets (including one or more scene adaptation sets and one or more audio object adaptation sets). More particularly, the audio metadata may include a mapping between scene and/or object audio data and adaptation sets including the scene/object audio data. Such metadata may be referred to herein as availability data.

The audio decoder (or other unit) may further receive selection data from a user interface. The user may select which of the scene and/or audio objects are desired for output. Alternatively, the user may select an audio profile (e.g., "movie," "concert," "video game," etc.), and the user interface (or other unit) may be configured to determine which of the scene and audio objects correspond to the selected audio profile.

The audio decoder (or other unit) may determine which of the adaptation sets are to be retrieved based on the selection data and the availability data. The audio decoder may then provide instruction data to, e.g., a DASH client of the client device. The instruction data may indicate which of the adaptation sets are to be retrieved, or more particularly, from which of the adaptation sets data is to be retrieved. The DASH client may then select representations for the selected adaptation sets and retrieve segments from the selected representations accordingly (e.g., using HTTP GET or partial GET requests).

In this manner, a DASH client may both receive availability data and audio data. However, the availability data may be formatted according to a different format than the audio data (e.g., in MPEG-H 3D Audio format, rather than ISO BMFF). The availability data may also be formatted differently than other metadata, such as data of a Media Presentation Description (MPD) or other manifest file that may include the availability data. Therefore, the DASH client may not be able to correctly parse and interpret the availability data. Accordingly, an MPEG-H 3D audio decoder (or other unit or device separate from the DASH client) may decode the availability data and provide instruction data to the DASH client indicating from which adaptation sets audio data is to be retrieved. Of course, the DASH client may also retrieve video data from video adaptation sets, and/or other media data, such as timed text data. By receiving such instruction data from the separate unit or device, the DASH client is able to select an appropriate adaptation set and retrieve media data from the selected, appropriate adaptation set.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a non-transitory computer-readable storage medium comprising stored audio data, and video source 24 may comprise a non-transitory computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time (or are otherwise to be presented at the same time) and for which an audio frame and a video frame comprise, respectively, the audio data and the video data that was captured at the same time. In addition, audio data may be generated separately that is to be presented contemporaneously with the video and other audio data, e.g., narration.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. Similarly, audio encoder 26 may encode audio data in a variety of different ways with various characteristics. As discussed in greater detail below, for example, audio encoder 26 may form audio adaptation sets that each include one or more of scene-based audio data, channel-based audio data, and/or object-based audio data. In addition or in the alternative, audio encoder 26 may form adaptation sets that include scalable audio data. For example, audio encoder 26 may form adaptation sets for a base layer, left/right information, and height information, as discussed in greater detail below.

A representation, as used in this disclosure, may comprise one of audio data, video data, text data (e.g., for closed captions), or other such data. The representation may include an elementary stream, such as an audio elementary stream or a video elementary stream. Each PES packet may include a stream id that identifies the elementary stream to which the PES packet belongs. Encapsulation unit 30 is responsible for assembling elementary streams into video files (e.g., segments) of various representations. Encapsulation unit 30 receives PES packets for elementary streams of a representation from audio encoder 26 and video encoder 28 and forms corresponding network abstraction layer (NAL) units from the PES packets.

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then, for example, determine bitrates for representations in the adaptation set, determine a currently available amount of network bandwidth, and retrieve segments from one of the representations having a bitrate that can be satisfied by the network bandwidth.

In general, higher bitrate representations may yield higher quality playback, while lower bitrate representations may provide sufficient quality playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44. Audio output 42 may comprise one or more speakers, while video output 44 may include one or more displays. Although not shown in FIG. 1, client device 40 may also include one or more user interfaces, such as keyboards, mice, pointers, touchscreen devices, remote control interfaces (e.g., Bluetooth or infrared remote controls), or the like.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
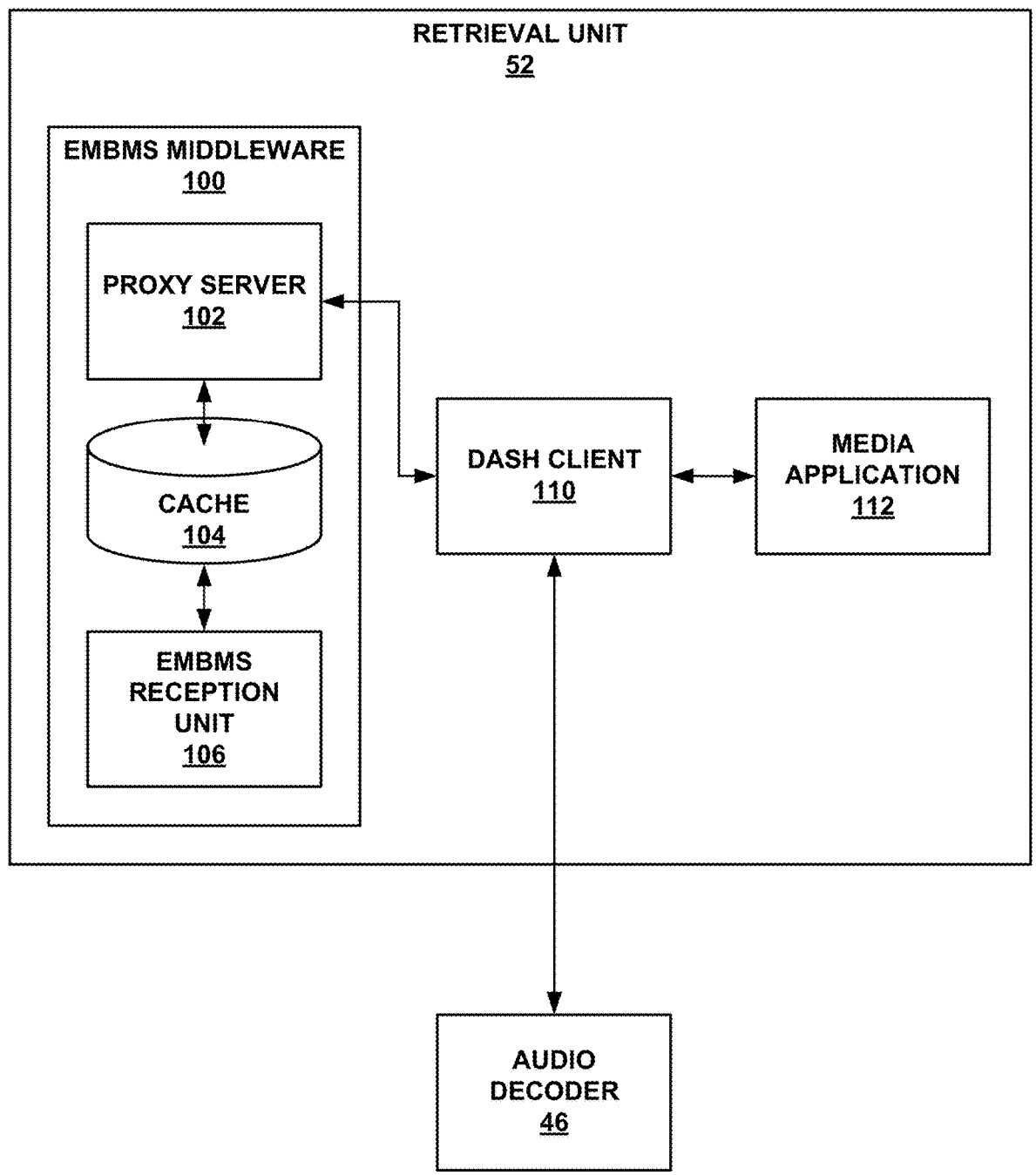
FIG. 2 is a block diagram illustrating an example set of components of a retrieval unit in greater detail.

As shown in and discussed in greater detail with respect to FIG. 2, retrieval unit 52 may include, e.g., a DASH client. The DASH client may be configured to interact with audio decoder 46, which may represent an MPEG-H 3D Audio decoder. Although not shown in FIG. 1, audio decoder 46 may further be configured to receive user input from a user interface (e.g., as shown in FIGS. 5-9). Thus, the DASH client may send availability data to audio decoder 46, which may determine which adaptation sets correspond to which types of audio data (e.g., scene, object, and/or channel audio data). Audio decoder 46 may further receive selection data, e.g., from a user via a user interface or from a pre-configured selection. Audio decoder 46 may then send instruction data to retrieval unit 52 (to be sent to the DASH client) to cause the DASH client to retrieve audio data for the selected adaptation sets (corresponding to selected types of audio data, e.g., scene, channel, and/or object data).

FIG. 2 is a block diagram illustrating an example set of components of retrieval unit 52 of FIG. 1 in greater detail. It should be understood that retrieval unit 52 of FIG. 2 is merely one example; in other examples, retrieval unit 52 may correspond to only a DASH client. In this example, retrieval unit 52 includes eMBMS middleware unit 100, DASH client 110, and media application 112. FIG. 2 also shows audio decoder 46 of FIG. 1, with which DASH client 110 may interact, as discussed below.

In this example, eMBMS middleware unit 100 further includes eMBMS reception unit 106, cache 104, and server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server 102 may act as a server for DASH client 110. For example, Proxy server 102 may provide a MPD file or other manifest file to DASH client 110. Proxy server 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from Proxy server 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to Proxy server 102. Proxy server 102 may retrieve requested data from cache 104 and provide the data to DASH client 110 in response to such requests.

Although in the example of FIG. 2, retrieval unit 52 includes eMBMS middleware unit 100, it should be understood that in other examples, other types of middleware may be provided. For example, a broadcast middleware, such as an Advanced Television Systems Committee (ATSC) or a National Television System Committee (NTSC) middleware may be provided in place of eMBMS middleware 100, to receive ATSC or NTSC broadcast signals, respectively. Such ATSC or NTSC middleware would include either an ATSC or NTSC reception unit in place of eMBMS reception unit 106, but otherwise include a proxy server and a cache as shown in the example of FIG. 2. The reception units may receive and cache all received broadcast data, and the proxy server may simply send only requested media data (e.g., requested audio data) to DASH client 110.

Moreover, DASH client 110 may interact with audio decoder 46 as discussed above with respect to FIG. 1. That is, DASH client 110 may receive a manifest file or other data set including availability data. The availability data may be formatted according to, e.g., MPEG-H 3D Audio. Moreover, the availability data may describe which adaptation set(s) include various types of audio data, such as scene audio data, channel audio data, object audio data, and/or scalable audio data. DASH client 110 may receive selection data from audio decoder 46, where the selection data may indicate adaptation sets from which audio data is to be retrieved, e.g., based on a user's selection.

Figure 3A:
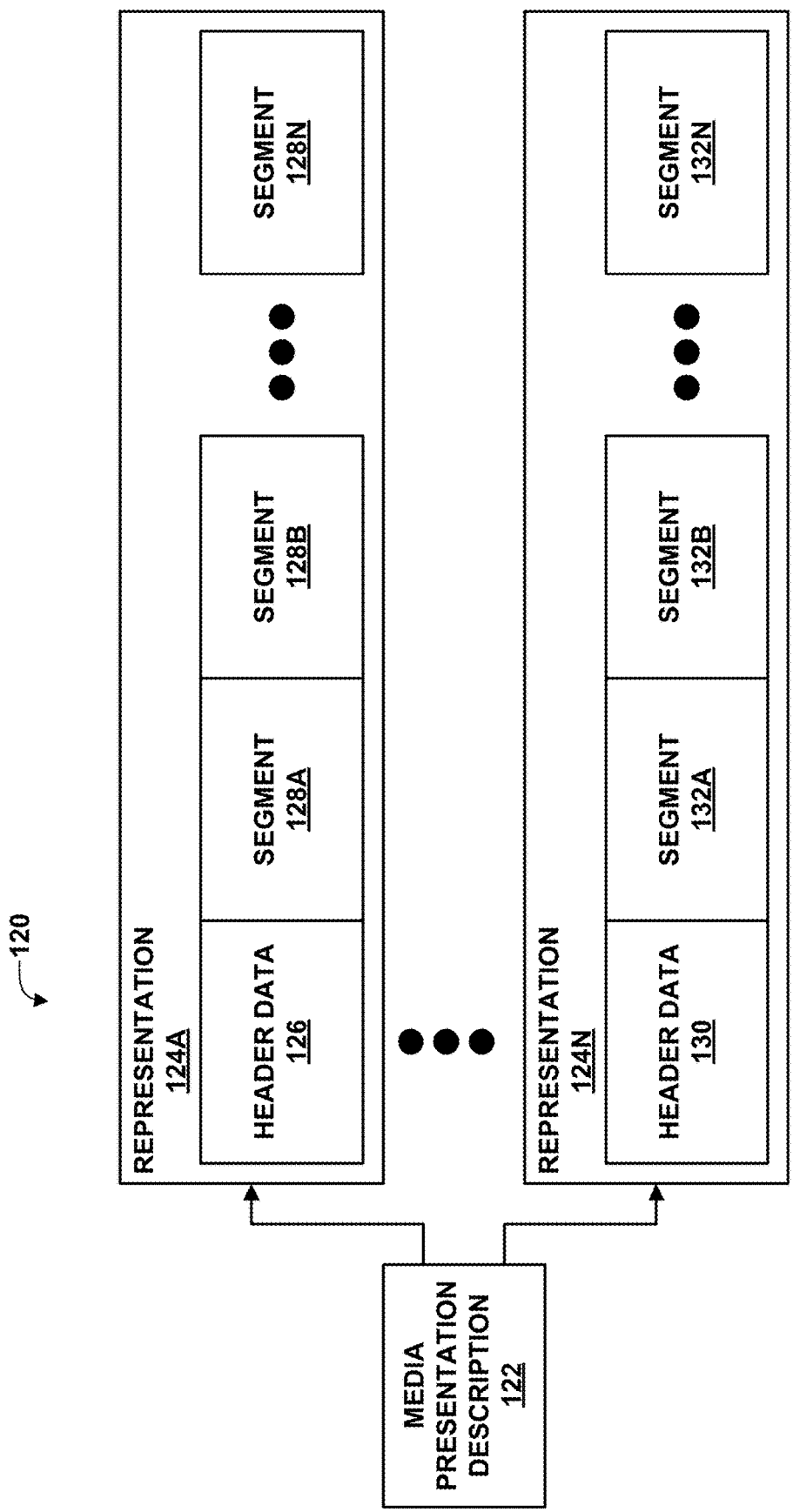
FIGS. 3A and 3B are conceptual diagrams illustrating elements of example multimedia content.

FIG. 3A is a conceptual diagram illustrating elements of example multimedia content 120. Multimedia content 120 may correspond to multimedia content 64 (FIG. 1), or another multimedia content stored in storage medium 62. In the example of FIG. 3A, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded media samples. Each of the coded media samples of segments 128 may have similar characteristics, e.g., language (if speech is included), location, CODEC, and bandwidth requirements. Such characteristics may be described by data of MPD 122, though such data is not illustrated in the example of FIG. 3A. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 3B:
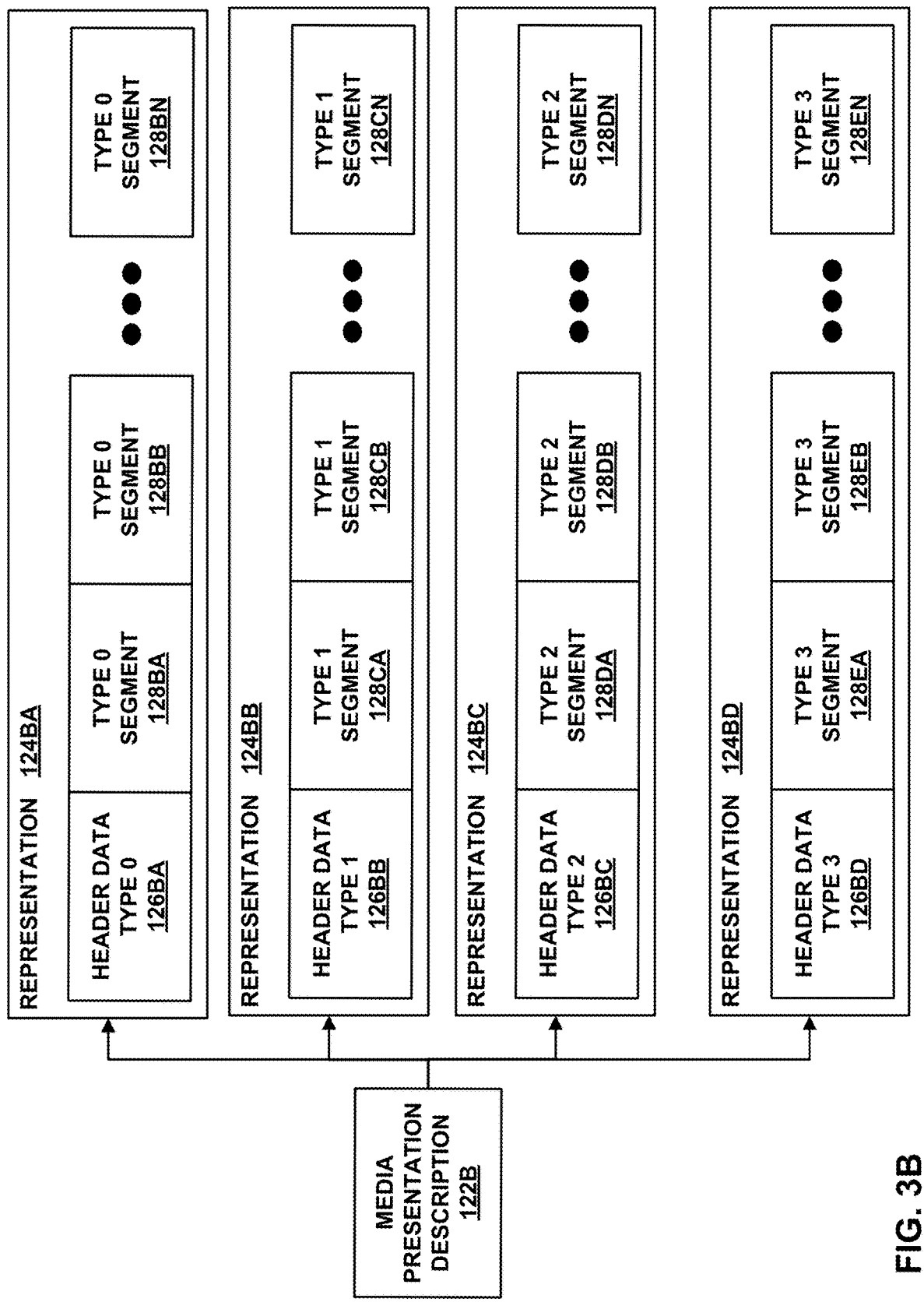

FIG. 3B is a conceptual diagram illustrating another example set of representations 124BA-124BD (representations 124B). In this example, it is assumed that the various representations 124B each correspond to different, respective adaptation sets.

Scalable scene based audio may include information about the reproduction layout. There may be different types of scene-based audio codecs. Different examples are described throughout the disclosure. For example, scene based audio scalable codec Type 0 may include: Layer 0 includes audio left and audio right channels, Layer 1 includes a horizontal HOA component, and Layer 2 includes height information of $1^{st}$ order HOA relating to the height of the loudspeakers (this is the scenario in FIGS. 13A and 13B).

Figure 14A:
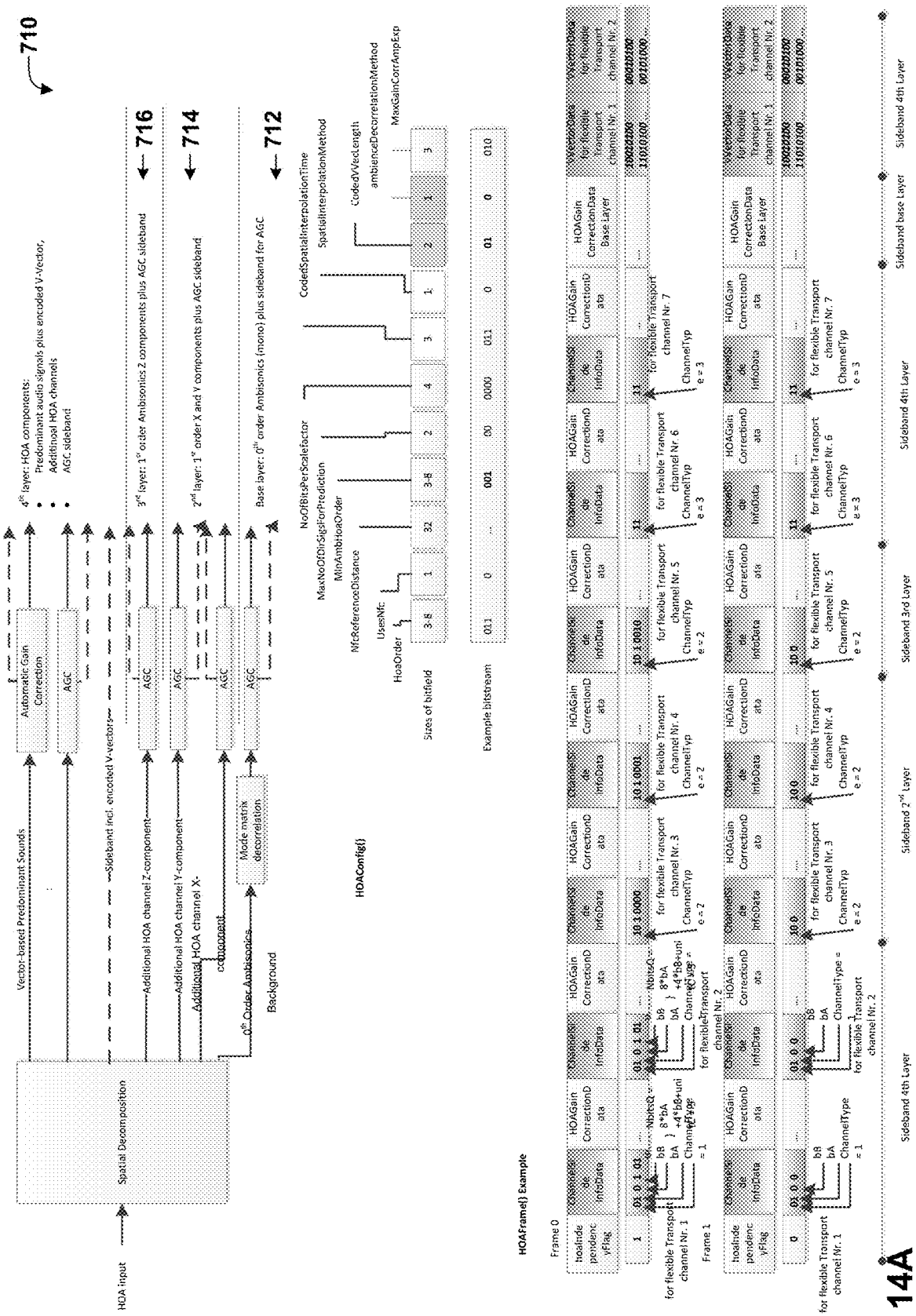
FIGS. 14A and 14B are conceptual diagrams illustrating additional examples of multi-layer audio data.
Figure 14B:
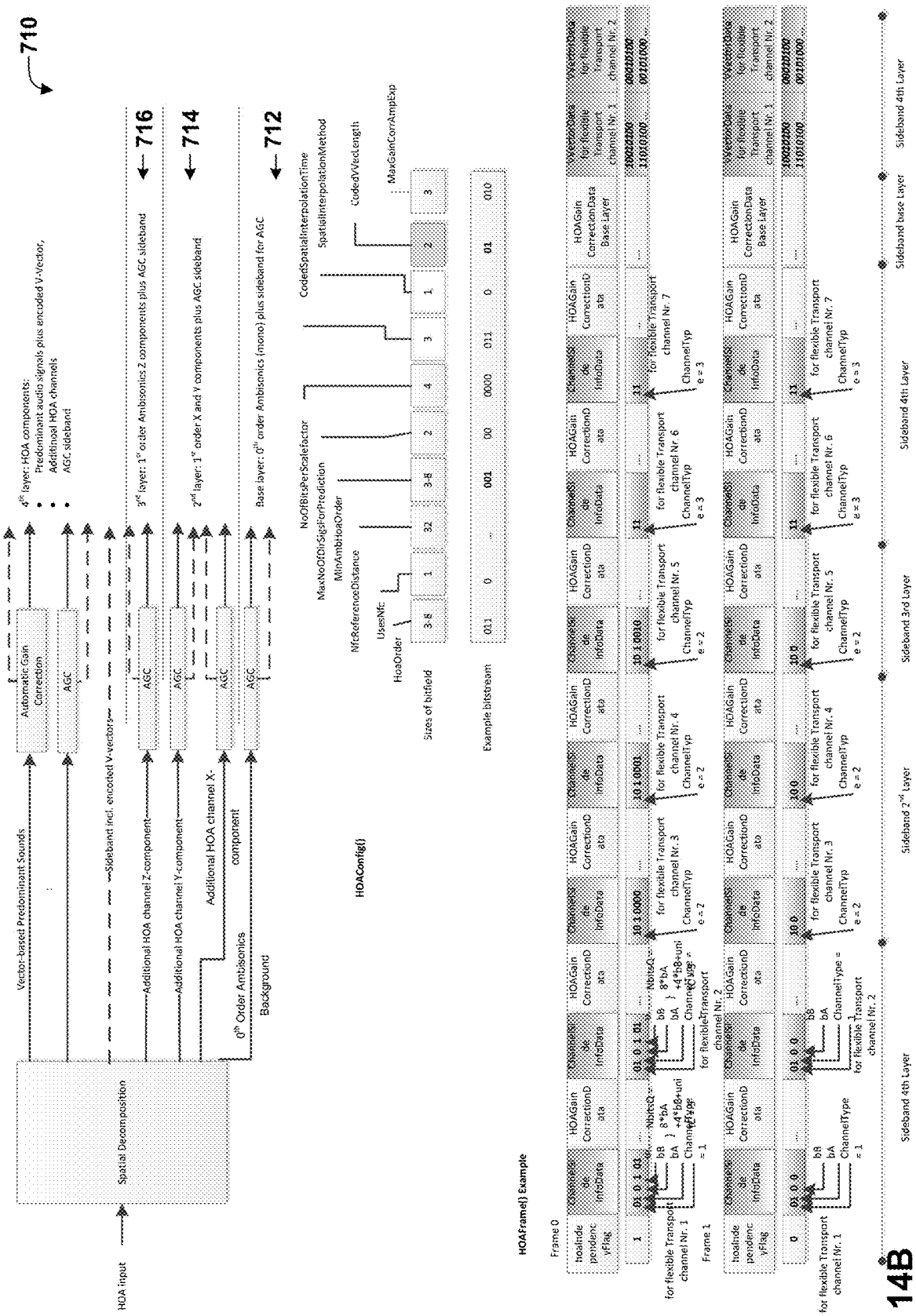

In a second example, scene based audio scalable codec type 1 may be include: Layer 0 includes audio left and audio right channels, Layer 1 includes a horizontal HOA component, and Layer 2 includes height information of $1^{st}$ order HOA relating to the height of the loudspeakers (e.g., as shown in FIGS. 14A and 14B).

In a third example, scene based audio scalable codec type 2 may include: Layer 0 includes a mono channel, Layer 1 includes audio left and audio right channels, Layer 2 includes audio front and audio back channels, and Layer 3 includes height information of Pt order HOA.

In a fourth example, scene based audio scalable codec type 3 may include: Layer 0 includes a $1^{st}$ order horizontal-only HOA information in the form of W, X, and Y signal. Layer 1 includes audio left and audio right channels, Layer 2 includes audio front and audio back channels, In a fifth example, the first through fourth examples may be used, and an additional layer may include height information for a different array of loudspeakers, e.g., at a height below or above a horizontal plane where speakers in the previous examples may be located.

Accordingly, representations 124 each correspond to different adaptation sets that include various types of scene based scalable audio data. Although four example representations 124 are shown, it should be understood that any number of adaptation sets (and any number of representations within those adaptation sets) may be provided.

In the example of FIG. 3B, representation 124BA includes Type 0 scalable scene based audio data, representation 124BB includes Type 1 scalable scene based audio data, representation 124BC includes Type 2 scalable scene based audio data, and representation 124BD includes Type 3 scalable scene based audio data. Representations 124B include respective segments of the corresponding types. That is, representation 124BA includes header data Type 0 126BA and Type 0 segments 128BA-128BN, representation 124BB includes header data Type 1 126BB and Type 1 segments 128CA-128CN, representation 124BC includes header data Type 2 126BC and Type 2 segments 128DA-128DN, and representation 124BD includes header data Type 3 126BD and Type 3 segments 128EA-128EN. The various adaptation sets (in particular, scalable audio layers included in the adaptation sets as well as which of representations 124B correspond to which adaptation sets) are described in MPD 122B.

Figure 4:
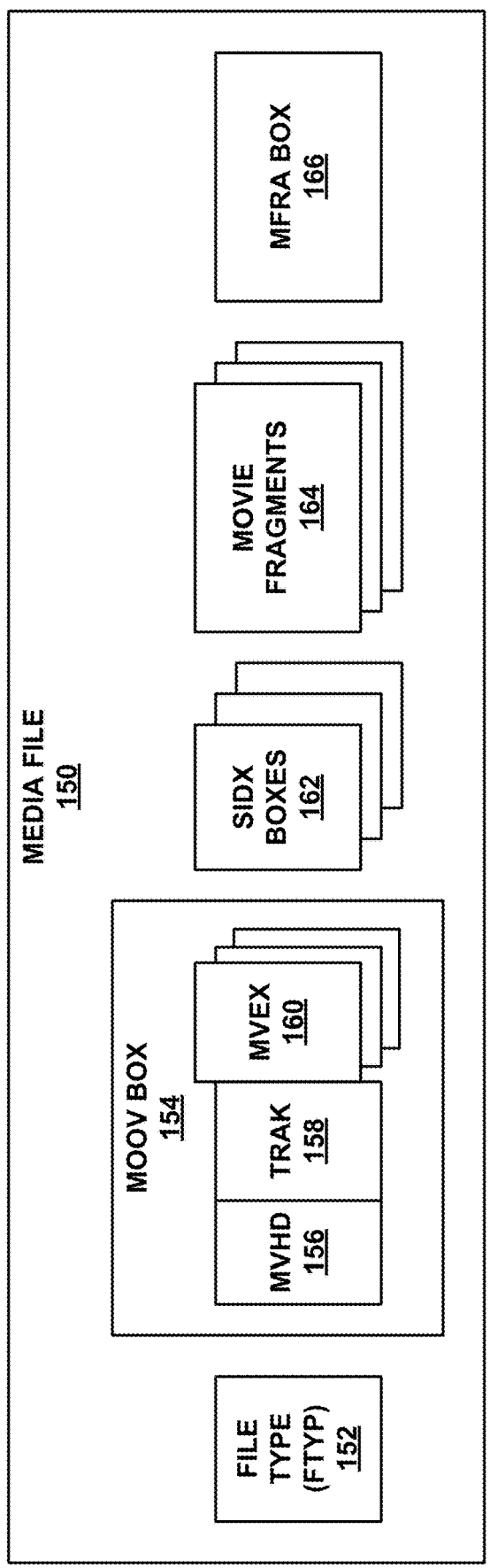
FIG. 4 is a block diagram illustrating elements of an example media file, which may correspond to a segment of a representation.

FIG. 4 is a block diagram illustrating elements of an example media file 150, which may correspond to a segment of a representation, such as one of segments 114, 124 of FIG. 3. Each of segments 128, 132 may include data that conforms substantially to the arrangement of data illustrated in the example of FIG. 4. Media file 150 may be said to encapsulate a segment. As described above, media files in accordance with the ISO base media file format and extensions thereof store data in a series of objects, referred to as "boxes." In the example of FIG. 4, media file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of media file 150, in accordance with the ISO base media file format and its extensions.

File type (FTYP) box 152 generally describes a file type for media file 150. File type box 152 may include data that identifies a specification that describes a best use for media file 150. File type box 152 may alternatively be placed before MOOV box 154, movie fragment boxes 164, and/or MFRA box 166.

MOOV box 154, in the example of FIG. 4, includes movie header (MVHD) box 156, track (TRAK) box 158, and one or more movie extends (MVEX) boxes 160. In general, MVHD box 156 may describe general characteristics of media file 150. For example, MVHD box 156 may include data that describes when media file 150 was originally created, when media file 150 was last modified, a timescale for media file 150, a duration of playback for media file 150, or other data that generally describes media file 150.

TRAK box 158 may include data for a track of media file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, media file 150 may include more than one track. Accordingly, MOOV box 154 may include a number of TRAK boxes equal to the number of tracks in media file 150. TRAK box 158 may describe characteristics of a corresponding track of media file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as media file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that media file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in media file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 (FIG. 1) may store a sequence data set in a video sample that does not include actual coded video data. A video sample may generally correspond to an access unit, which is a representation of a coded picture at a specific time instance. In the context of AVC, the coded picture includes one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of media file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within media file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in media file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in media file 150.

MFRA box 166 may describe random access points within movie fragments 164 of media file 150. This may assist with performing trick modes, such as performing seeks to particular temporal locations (i.e., playback times) within a segment encapsulated by media file 150. MFRA box 166 is generally optional and need not be included in video files, in some examples. Likewise, a client device, such as client device 40, does not necessarily need to reference MFRA box 166 to correctly decode and display video data of media file 150. MFRA box 166 may include a number of track fragment random access (TFRA) boxes (not shown) equal to the number of tracks of media file 150, or in some examples, equal to the number of media tracks (e.g., non-hint tracks) of media file 150.

In some examples, movie fragments 164 may include one or more stream access points (SAPs). Likewise, MFRA box 166 may provide indications of locations within media file 150 of the SAPs. Accordingly, a temporal sub-sequence of media file 150 may be formed from SAPs of media file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5A:
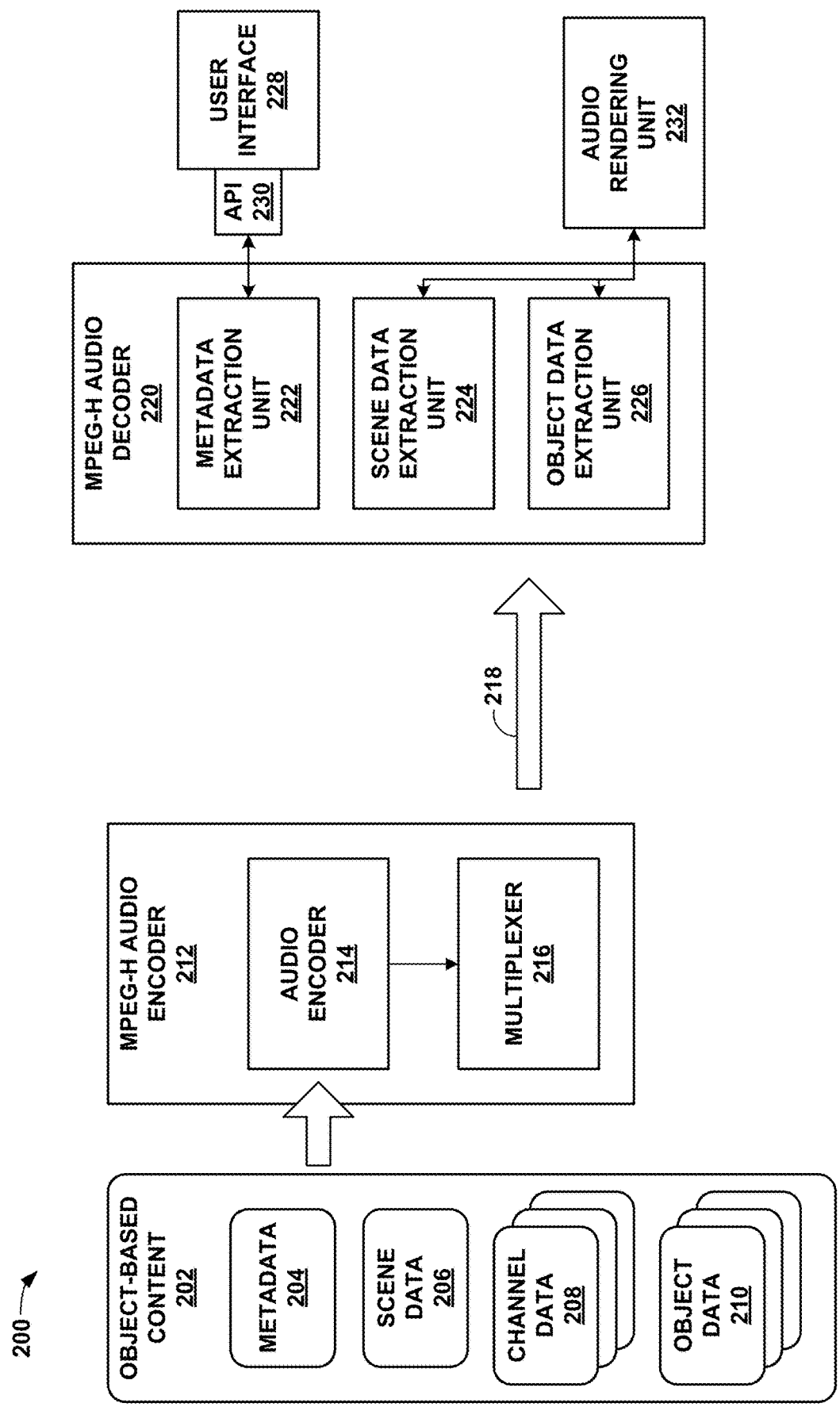
FIGS. 5A and 5B are block diagrams illustrating an example system for transporting encoded media data, such as encoded 3D audio data.
Figure 5B:
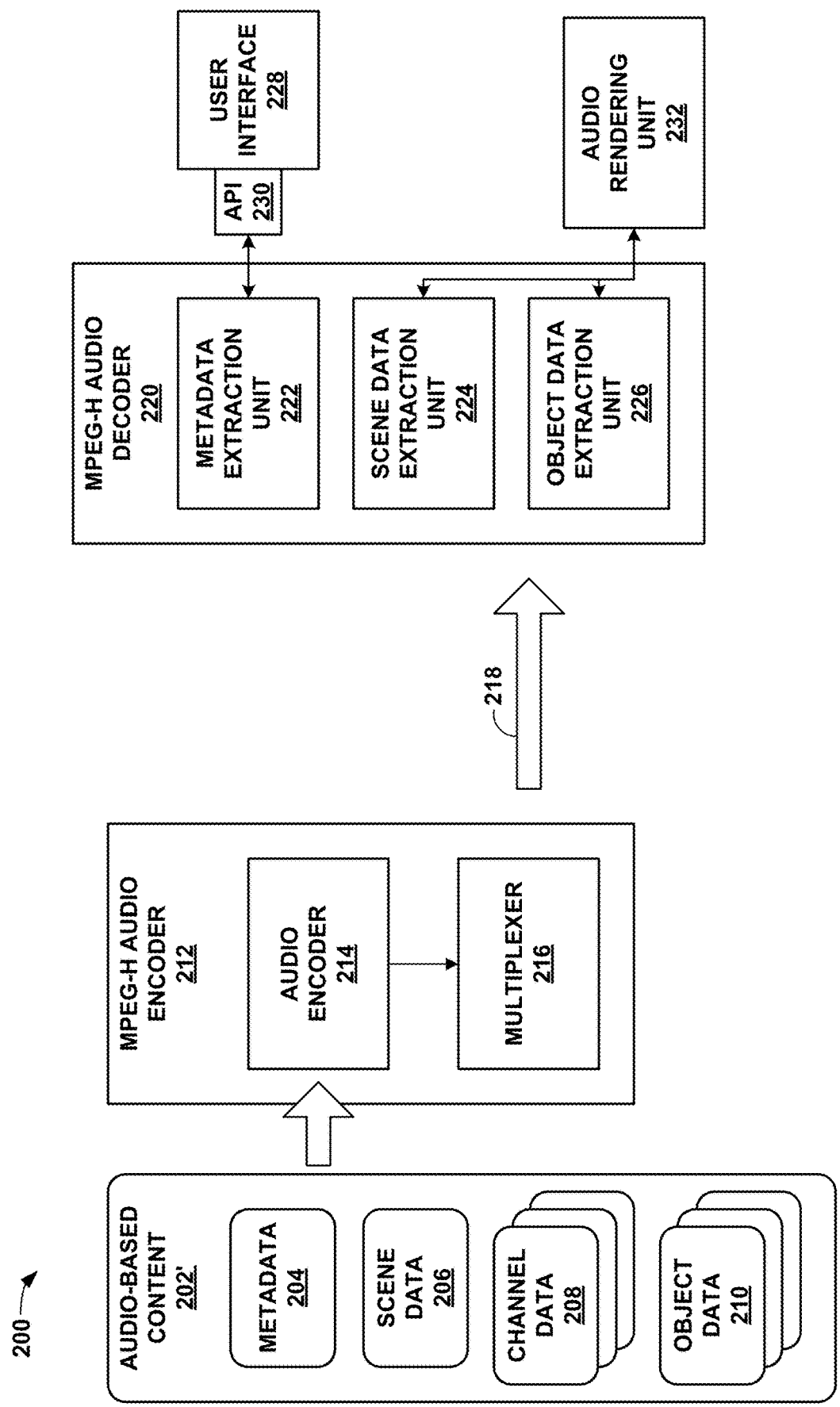

FIG. 5A is a block diagram illustrating an example system 200 for transporting encoded media data, such as encoded 3D audio data. System 200 includes object-based content 202, which itself includes metadata 204, scene data 206, various sets of channel data 208, and various sets of object data 210. FIG. 5B is substantially similar to FIG. 5A, except that FIG. 5B includes audio-based content 202' in place of object-based content 202 of FIG. 5A. Object-based content 202 is provided to MPEG-H audio encoder 212, which includes audio encoder 214 and multiplexer 216. MPEG-H audio encoder 212 may generally correspond to audio encoder 26 (FIG. 1). Multiplexer 216 may form part of, or interact with, encapsulation unit 30 (FIG. 1). Although not shown in FIG. 5A, it should be understood that video encoding and multiplexing units may also be provided, as shown in FIG. 1.

In this example, MPEG-H audio encoder 212 receives object-based content 202 and causes audio encoder 214 to encode object-based content 202. The encoded and multiplexed audio data 218 is transported to MPEG-H audio decoder 220, which includes metadata extraction unit 222, scene data extraction unit 224, and object data extraction unit 226. User interface 228 is provided to allow a user to access a version of extracted metadata via application programming interface (API) 230, such that the user can select one or more of scene data 206, channel data 208, and/or object data 210 to be rendered during playback. According to the selected scene, channel, and/or objects, scene data extraction unit 224 and object data extraction unit 226 may extract the requested scene, channel, and/or object data, which MPEG-H audio decoder 220 decodes and provides to audio rendering unit 232 during playback.

Figure 6A:
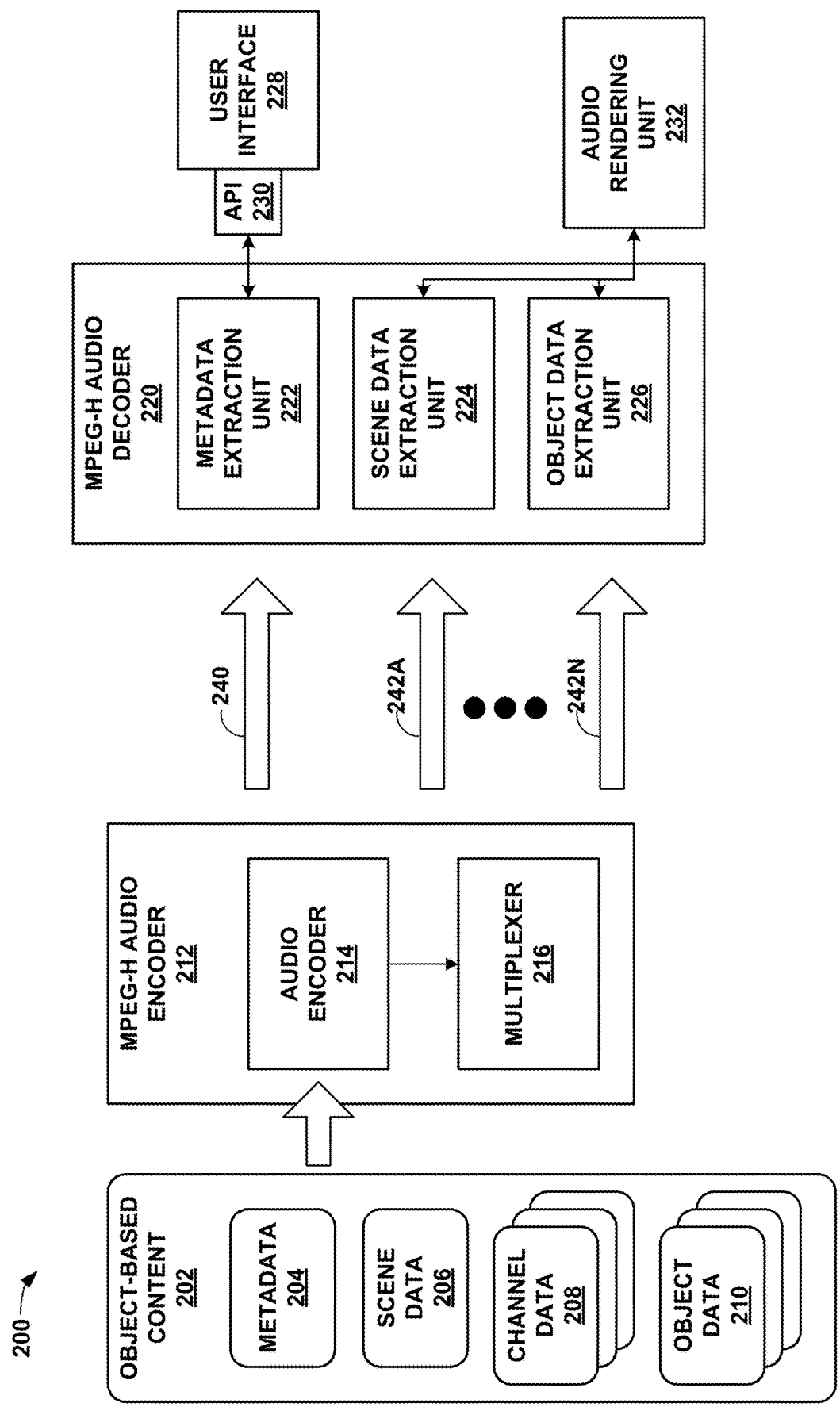
FIGS. 6A and 6B are block diagrams illustrating another example in which the various types of data from object-based content are streamed separately.
Figure 6B:
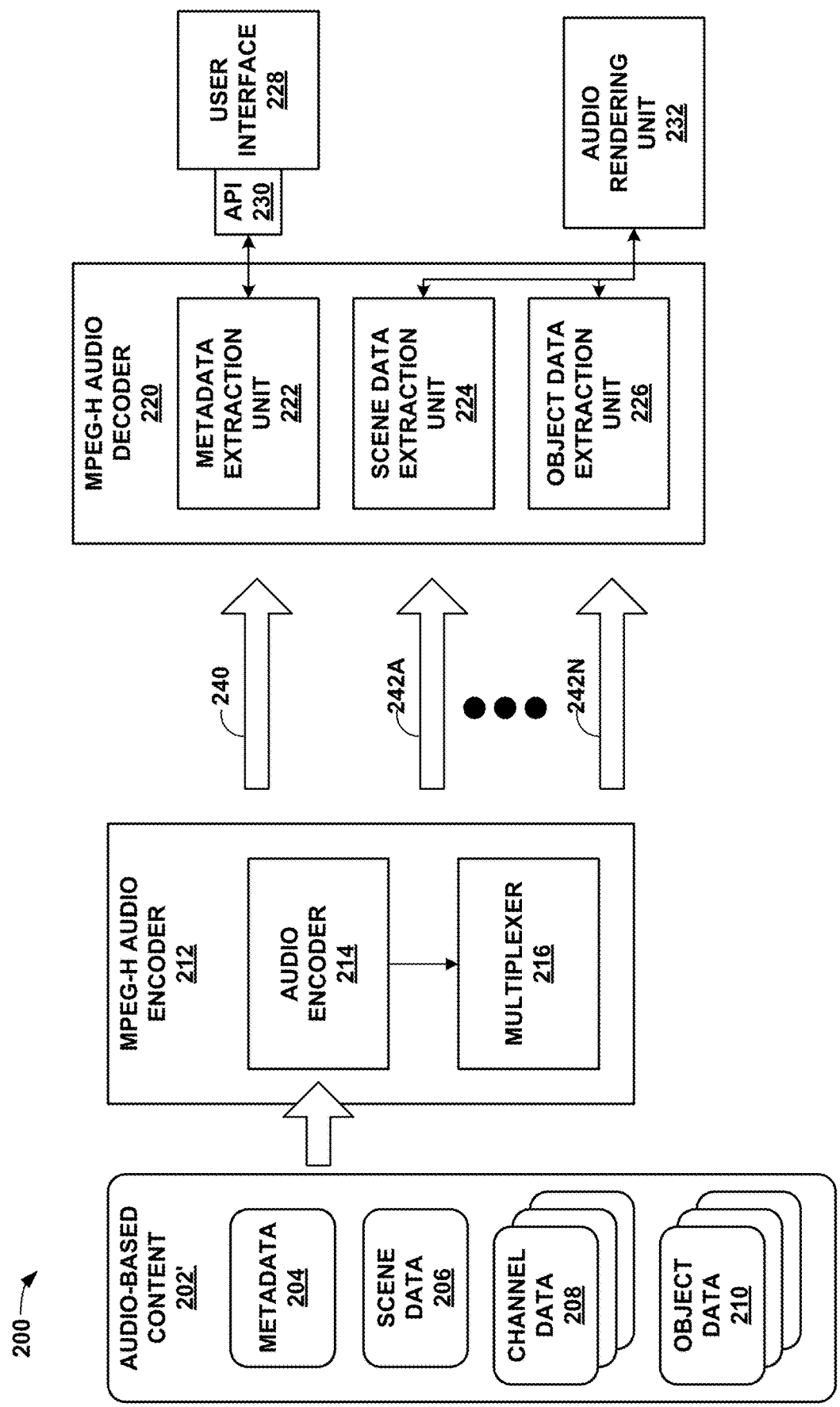

In the example of FIG. 5A, all of the data of object-based content 202 is provided in a single stream, represented by encoded and multiplexed audio data 218. However, multiple streams may be used to separately provide different elements of object-based content 202. For example, FIGS. 6A and 6B are block diagrams illustrating other examples in which the various types of data from object-based content 202 (or audio-based content 202') are streamed separately. In particular, in the examples of FIGS. 6A and 6B, an encoded version of scene data 206 is provided in stream 240, which may also includes encoded versions of channel data 208.

In the examples of FIGS. 6A and 6B, encoded versions of object data 210 are provided in the form of streams 242A-242N (streams 242). The mapping between object data 210 and streams 242 may be formed in any way. For example, there may be a one-to-one mapping between sets of object data 210 and streams 242, multiple sets of object data 210 may be provided in a single stream of streams 242, and/or one or more of streams 242 may include data for one set of object data 210. Streams 218, 240, 242 may be transmitted using over-the-air signals such as Advanced Television Systems Committee (ATSC) or National Television System Committee (NTSC) signals, computer-network-based broadcast or multicast such as eMBMS, or computer-network-based unicast such as HTTP. In this manner, when certain sets of object data 210 are not desired, MPEG-H audio decoder 220 may avoid receiving data of the corresponding ones of streams 242.

In accordance with some examples of this disclosure, each scene may have configuration information (e.g., in the movie header, such as MOOV box 154 of FIG. 4). The configuration information may contain information on objects and what they represent. The configuration information may also contain some information that can be used by an interactivity engine. Conventionally, this configuration information has been static and could hardly be changed. However, this information can be modified in-band using techniques of MPEG-2 TS. The configuration information also describes a mapping of objects to different streams, as shown in FIGS. 6A and 6B.

A main stream, such as stream 240 of FIG. 6A, may include the configuration information as well as where to find all of the objects (e.g., object data 210). For example, stream 240 may include data indicating which of streams 242 contain which of object data 210. Streams 242 may be referred to as "supplementary streams," because they may carry only access units of the contained ones of object data 210. In general, each object may be carried in an individual one of supplementary streams 242, although as discussed above, supplementary streams may carry data for multiple objects and/or an object may be carried in multiple supplementary streams.

API 230 exists between user interface 228 and metadata extraction unit 222. API 230 may allow interactivity with a configuration record of metadata included in the main stream. Thus, API 230 may allow a user or other entity to select one or more objects of object data 210 and define their rendering. For example, a user may select which objects of object data 210 are desired, as well as a volume at which to play each of the desired objects.

In the discussion below, it is assumed that each object of object data 210 is offered in a separate supplementary stream (e.g., that there is a one-to-one and onto relationship between object data 210 and streams 242). However, it should be understood that object data 210 may be multiplexed and mapped as a delivery optimization. In accordance with DASH, each supplementary stream may be mapped into one or more representations.

Figure 7B:
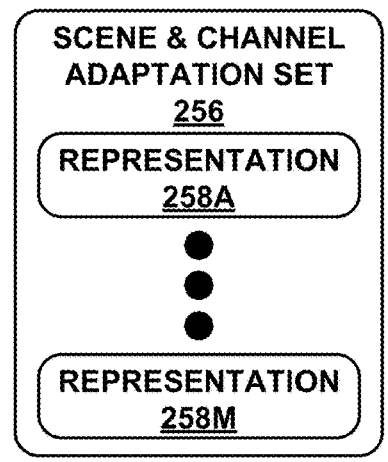
Figure 7B:
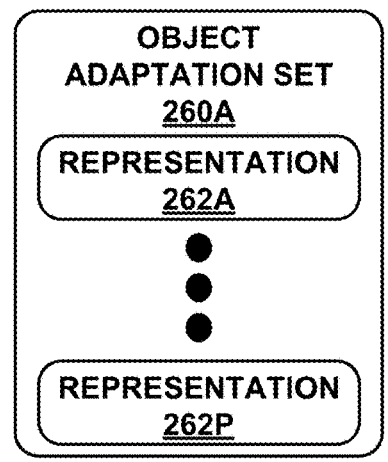
Figure 7B:
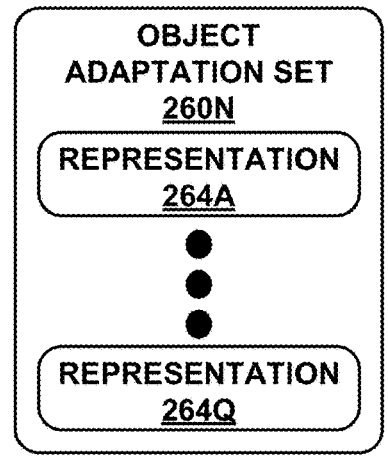
Figure 7C:
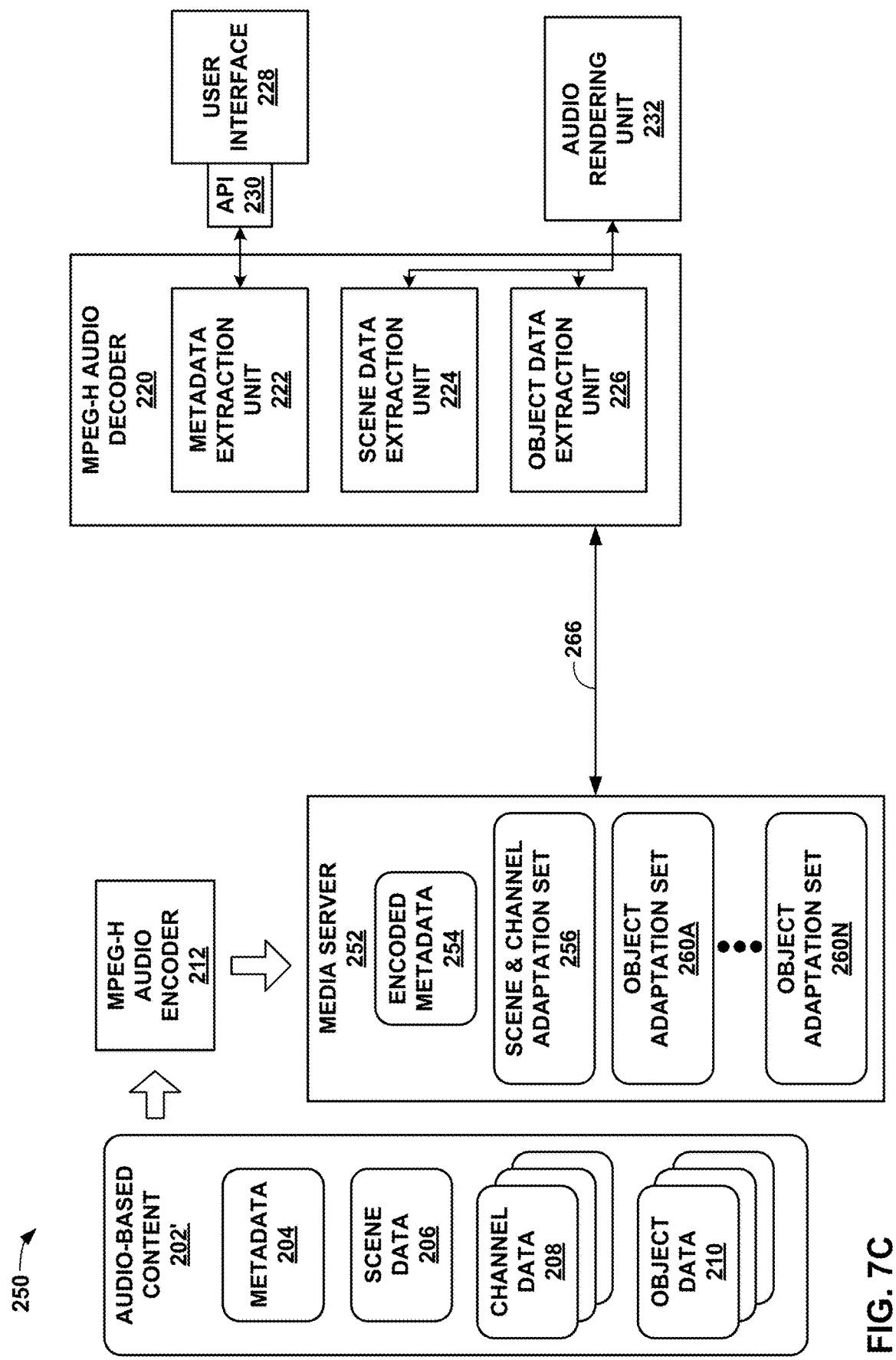

FIGS. 7A-7C are block diagrams illustrating another example system 250 in accordance with the techniques of this disclosure. System 250 generally includes elements similar to those of system 200 of FIGS. 5A, 5B, 6A, and 6B, which are numbered the same in FIGS. 7A and 7B. However, system 250 additionally includes media server 252, which was not shown in FIGS. 5A, 5B, 6A, and 6B. FIG. 7C is substantially similar to FIG. 7A, except that FIG. 7C includes audio-based content 202' in place of object-based content 202 of FIG. 7A.

In accordance with the techniques of this disclosure, media server 252 provides encoded metadata 254, scene and channel adaptation set 256, and a variety of object adaptation sets 260A-260N (object adaptation sets 260). As shown in FIG. 7B, scene & channel adaptation set 256 includes representations 258A-258M (representations 258), object adaptation set 260A includes representations 262A-262P (representations 262), and object adaptation set 260N includes representations 264A-264Q (representations 264). Although in this example, scene and channel adaptation set 256 is shown as a single adaptation set, in other examples, separate adaptation sets may be provided for scene data and channel data. That is, in some examples, a first adaptation set may include scene data and a second adaptation set may include channel data.

In the example of FIGS. 7A and 7B, content is offered according to the following mapping. There is one master object that is the entry point and carries the configuration information. Each object is offered as one Adaptation Set (which is selectable). Within each Adaptation Set, multiple representations are offered (which are switchable). That is, each representation for a given adaptation set may have a different bitrate, to support bandwidth adaptation. Metadata is offered that points to the objects (separately, there may be a mapping between objects and adaptation sets, e.g., in MPEG-H metadata). All representations, in this example, are time-aligned, to permit synchronization and switching.

At the receiver (which includes MPEG-H audio decoder 220), initially all objects are assumed to be available. The labeling of contained data may be considered "opaque," in that the mechanisms for delivery need not determine what data is carried by a given stream. Instead, abstract labeling may be used. Selection of representations is typically part of the DASH client operation, but may be supported by API 230. An example of a DASH client is shown in FIG. 8, as discussed below.

Figure 8:
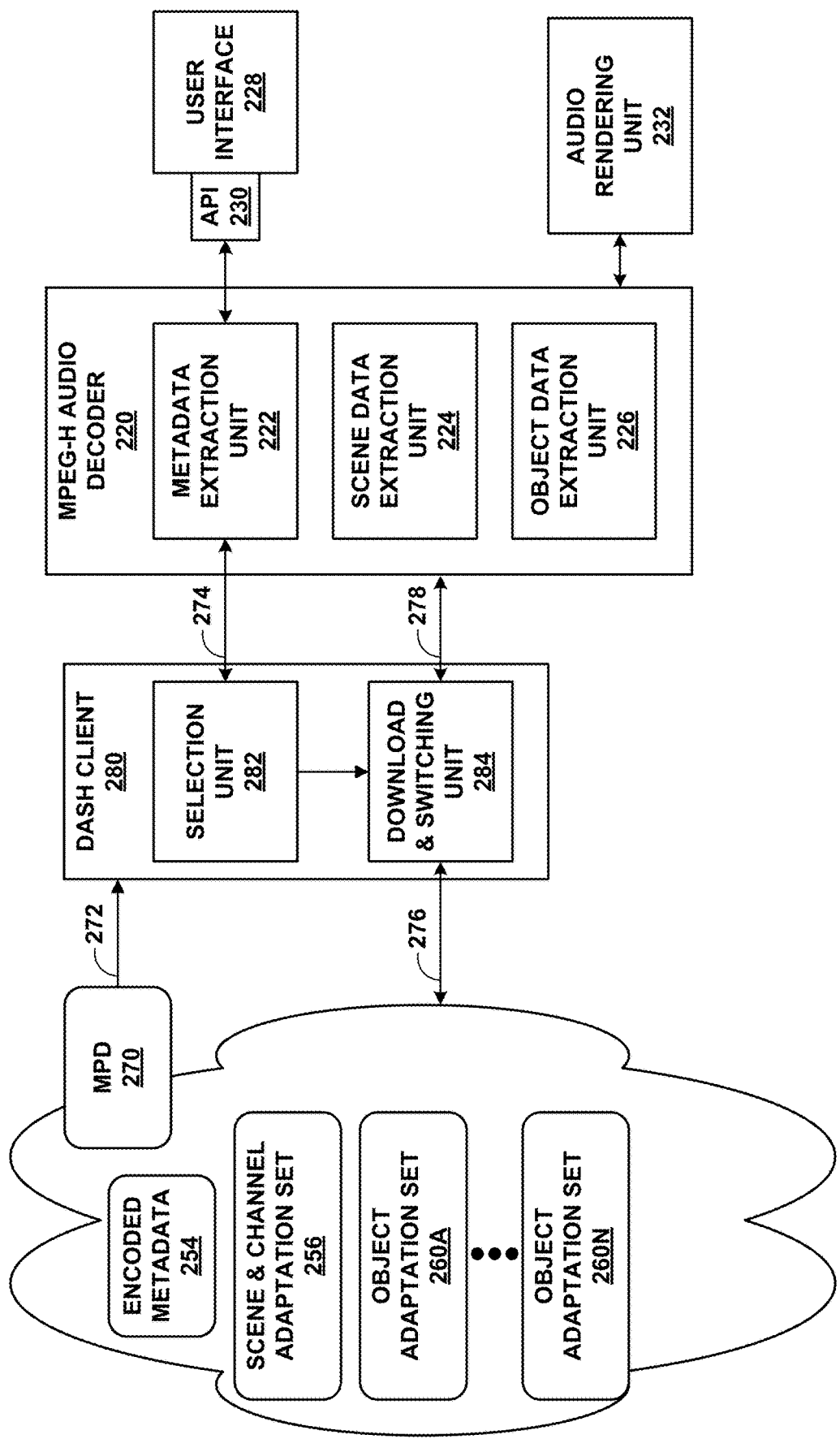
FIG. 8 is a block diagram illustrating a further example system in accordance with the techniques of this disclosure.

FIG. 8 is a block diagram illustrating a further example system in accordance with the techniques of this disclosure. In particular, in FIG. 8, a content delivery network (represented by a cloud) provides encoded metadata 254, scene and channel adaptation set 256, and object adaptation sets 260, as well as media presentation description (MPD) 270. Although not shown in FIG. 8, media server 252 may form part of the content delivery network.

In addition, FIG. 8 illustrates DASH client 280. In this example, DASH client 280 includes selection unit 282 and download & switching unit 284. Selection unit 282 is generally responsible for selecting adaptation sets and making initial selections of representations from the adaptation sets, e.g., in accordance with selections received from metadata extraction unit 222 based on selections received from user interface 228 via API 230.

The following is one example of a basic operational sequence, with reference to the elements of FIG. 8 for purposes of example and explanation, in accordance with the techniques of this disclosure. Initially, DASH client 280 downloads MPD 270 (272) and a master set of audio data that contains audio metadata and one representation of each available audio object (that is, each available audio Adaptation Set). Configuration information is made available to metadata extraction unit 222 of MPEG-H audio decoder 220, which interfaces with user interface 228 via API 230 for manual selection/deselection of objects or user agent selection/deselection (that is, automated selection/deselection). Likewise, selection unit 282 of DASH client 280 receives selection information. That is, MPEG-H audio decoder 220 informs DASH client 280 as to which Adaptation Set (labeled by a descriptor or other data element) is to be selected or deselected. This exchange is represented by element 274 of FIG. 8.

Selection unit 282 then provides instructions to download & switching unit 284 to retrieve data for the selected adaptation sets, and to stop downloading data for deselected adaptation sets. Accordingly, download & switching unit 284 retrieves data for the selected (but not for the deselected) adaptation sets from the content delivery network (276). For example, download & switching unit 284 may submit HTTP GET or partial GET requests to the content delivery network to retrieve segments of selected representations of the selected adaptation sets.

In some examples, because certain adaptation sets are deselected, download & switching unit 284 may allocate bandwidth that had previously been allocated to the deselected adaptation sets to other adaptation sets that remain selected. Thus, download & switching unit 284 may select a higher bitrate (and, thus, higher quality) representation for one or more of the selected adaptation sets. In some examples, DASH client 280 and MPEG-H audio decoder 220 exchange information on quality expectations of certain adaptation sets. For example, MPEG-H audio decoder 220 may receive relative volumes for each of the selected adaptation sets, and determine that higher quality representations should be retrieved for adaptation sets having higher relative volumes than adaptation sets having lower relative volumes.

In some examples, rather than stopping retrieval for deselected adaptation sets, DASH client 280 may simply retrieve data for lowest bitrate representations of the adaptation sets, which may be buffered by not decoded by MPEG-H audio decoder 220. In this manner, if at some point in the future one of the deselected adaptation sets is again selected, the buffered data for that adaptation set may be immediately decoded. If necessary and if bandwidth is available, download & switching unit 284 may switch to a higher bitrate representation of such an adaptation set following reselection.

After retrieving data for the selected adaptation sets, download & switching unit 284 provides the data to MPEG-H audio decoder 220 (278). Thus, MPEG-H audio decoder 220 decodes the received data, following extraction by corresponding ones of scene data extraction unit 224 and object data extraction unit 226, and provides the decoded data to audio rendering unit 232 for rendering, and ultimately, presentation.

Various additional APIs beyond API 230 may also be provided. For example, an API may be provided for signaling data in MPD 270. Metadata of MPD 270 may be explicitly signaled as one object that is to be downloaded for usage in the MPEG-H audio. MPD 270 may also signal all audio adaptation sets that need to be downloaded. Furthermore, MPD 270 may signal labels for each adaptation set to be used for selection.

Likewise, an API may be defined for selection and preference logic between the MPEG-H audio decoder 220 and DASH client 280. DASH client 280 may use this API to provide configuration information to MPEG-H audio decoder 220. MPEG-H audio decoder 220 may provide a label to DASH client 280 indicative of an adaptation set that is selected for purposes of data retrieval. MPEG-H audio decoder 220 may also provide some weighting that represents relative importance of the various adaptation sets, used by DASH client 280 to select appropriate representations for the selected adaptation sets.

Furthermore, an API may be defined for providing multiplexed media data from DASH client 280 to MPEG-H audio decoder 220. DASH client 280 generally downloads chunks of data assigned to adaptation sets. DASH client 280 provides the data in a multiplexed and annotated fashion, and also implements switching logic for switching between representations of an adaptation set.

In this manner, FIG. 8 represents an example of a device for retrieving audio data, the device including one or more processors configured to receive availability data representative of a plurality of available adaptation sets, the available adaptation sets including a scene-based audio adaptation set and one or more object-based audio adaptation sets, receive selection data identifying which of the scene-based audio adaptation set and the one or more object-based audio adaptation sets are to be retrieved, and provide instruction data to a streaming client to cause the streaming client to retrieve data for each of the adaptation sets identified by the selection data; and a memory configured to store the retrieved data for the audio adaptation sets.

Figure 9:
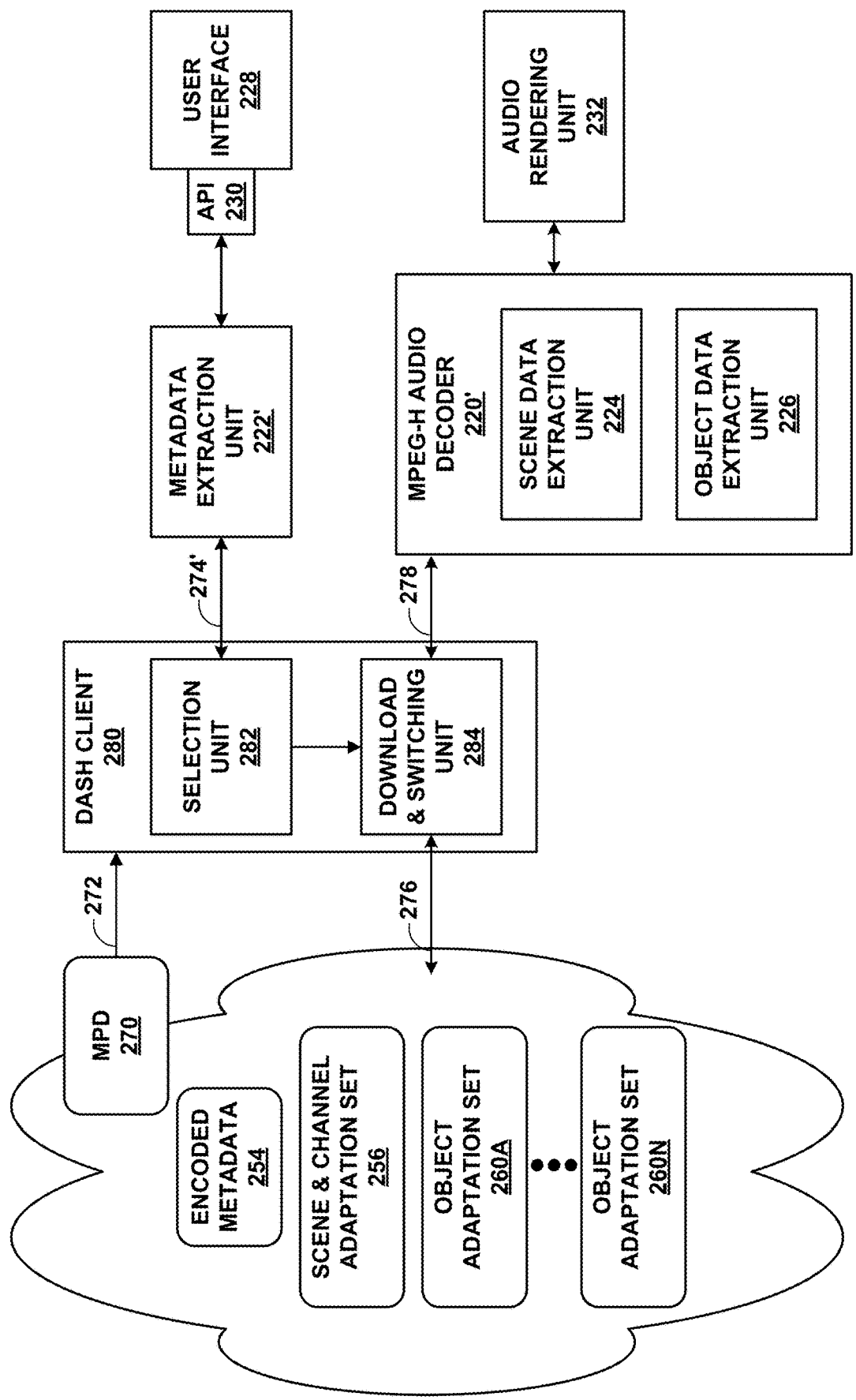
FIG. 9 is another example system in accordance with the techniques of this disclosure.

FIG. 9 is another example system in accordance with the techniques of this disclosure. In general, FIG. 9 is substantially similar to the example of FIG. 8. The distinction between FIGS. 8 and 9 is that in FIG. 9, metadata extraction unit 222' is provided external to MPEG-H audio decoder 220'. Thus, in FIG. 8, interaction 274' occurs between selection unit 282 and metadata extraction unit 222' for providing metadata representative of available adaptation sets and for selection of (and/or deselection of) the available adaptation sets. Otherwise, the example of FIG. 9 may operate in a manner that is substantially consistent with the example of FIG. 8. However, it is emphasized that a user interface need not interact directly with MPEG-H audio decoder 220' to perform the techniques of this disclosure.

In this manner, FIG. 9 represents an example of a device for retrieving audio data, the device including one or more processors configured to receive availability data representative of a plurality of available adaptation sets, the available adaptation sets including a scene-based audio adaptation set and one or more object-based audio adaptation sets, receive selection data identifying which of the scene-based audio adaptation set and the one or more object-based audio adaptation sets are to be retrieved, and provide instruction data to a streaming client to cause the streaming client to retrieve data for each of the adaptation sets identified by the selection data; and a memory configured to store the retrieved data for the audio adaptation sets.

Figure 10:
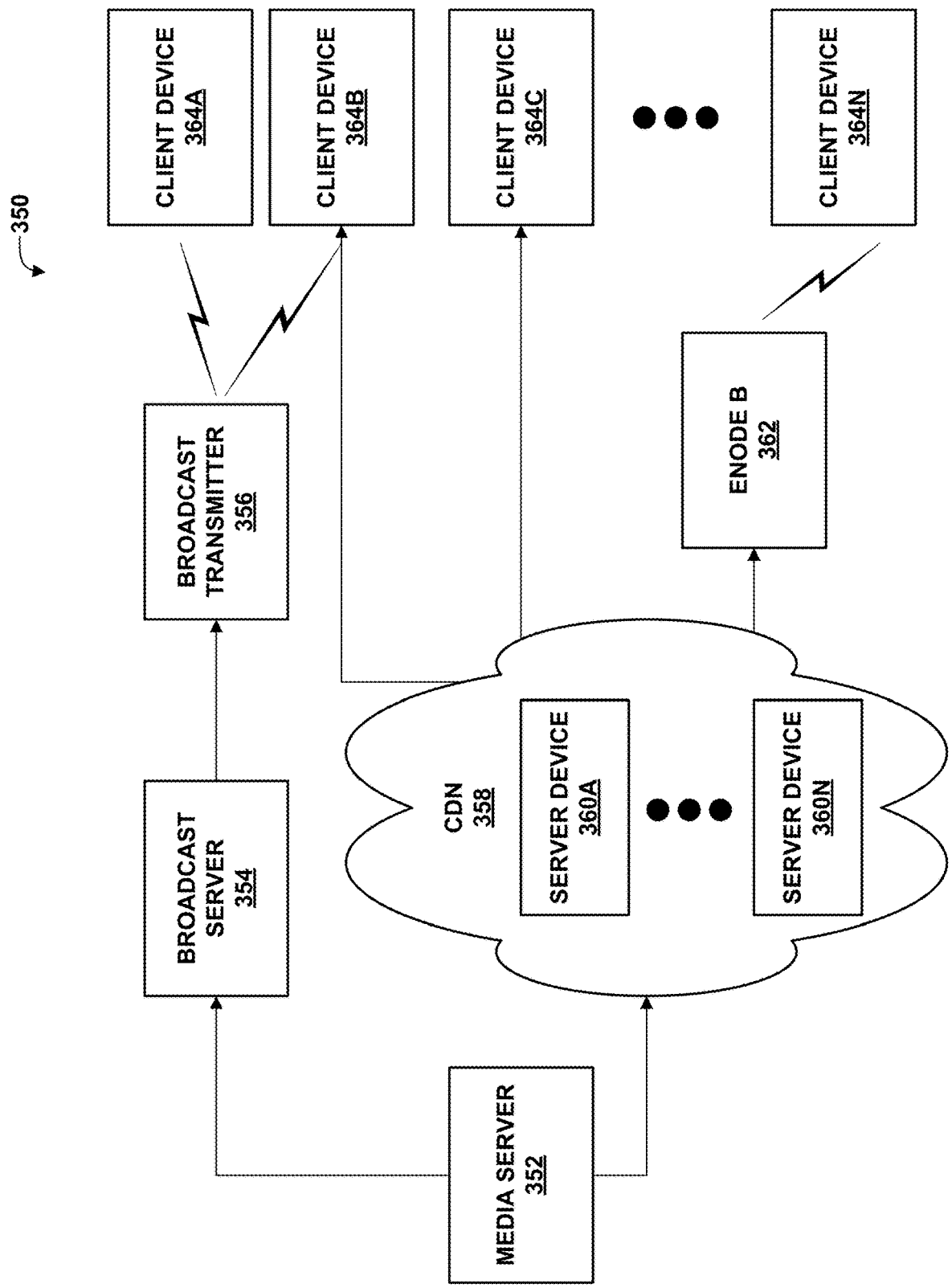
FIG. 10 is a conceptual diagram illustrating another example system in which the techniques of this disclosure may be used.

FIG. 10 is a conceptual diagram illustrating another example system 350 in which the techniques of this disclosure may be used. In the example of FIG. 10, system 350 includes media server 352, which prepares media content and provides the media content to broadcast server 354 and HTTP content delivery network (CDN) 358. Broadcast server 354 may be, for example, a broadcast multimedia service center (BMSC). Broadcast server 354 broadcasts a media signal via broadcast transmitter 356. Various user equipment (UE) client devices 364A-364N (client devices 364), such as televisions, personal computers, or mobile devices such as cellular telephones, tablets, or the like, may receive the broadcasted signal. Broadcast transmitter 356 may operate according to an over-the-air standard, such as ATSC or NTSC.

HTTP CDN 358 may provide the media content via a computer-based network, which may use HTTP-based streaming, e.g., DASH. Additionally or alternatively, CDN 358 may broadcast or multicast the media content over the computer-based network, using a network-based broadcast or multicast protocol such as eMBMS. CDN 358 includes a plurality of server devices 360A-360N (server devices 360) that transmit data via unicast, broadcast, and/or multicast protocols. In some examples, CDN 358 delivers the content over a radio-access network (RAN) via an eNode-B, such as eNode-B 362, in accordance with Long Term Evolution (LTE).

Various use cases may occur in the system of FIG. 10. For example, some media components may be delivered via broadcast (e.g., by broadcast server 354), while other media components may be available only through unicast as one or more companion streams. For example, scene-based audio content may be broadcast by the broadcast server via the broadcast transmitter, while object audio data may only be available from HTTP CDN 358. In another example, data may be delivered via unicast to reduce channel-switch times.

Figure 11:
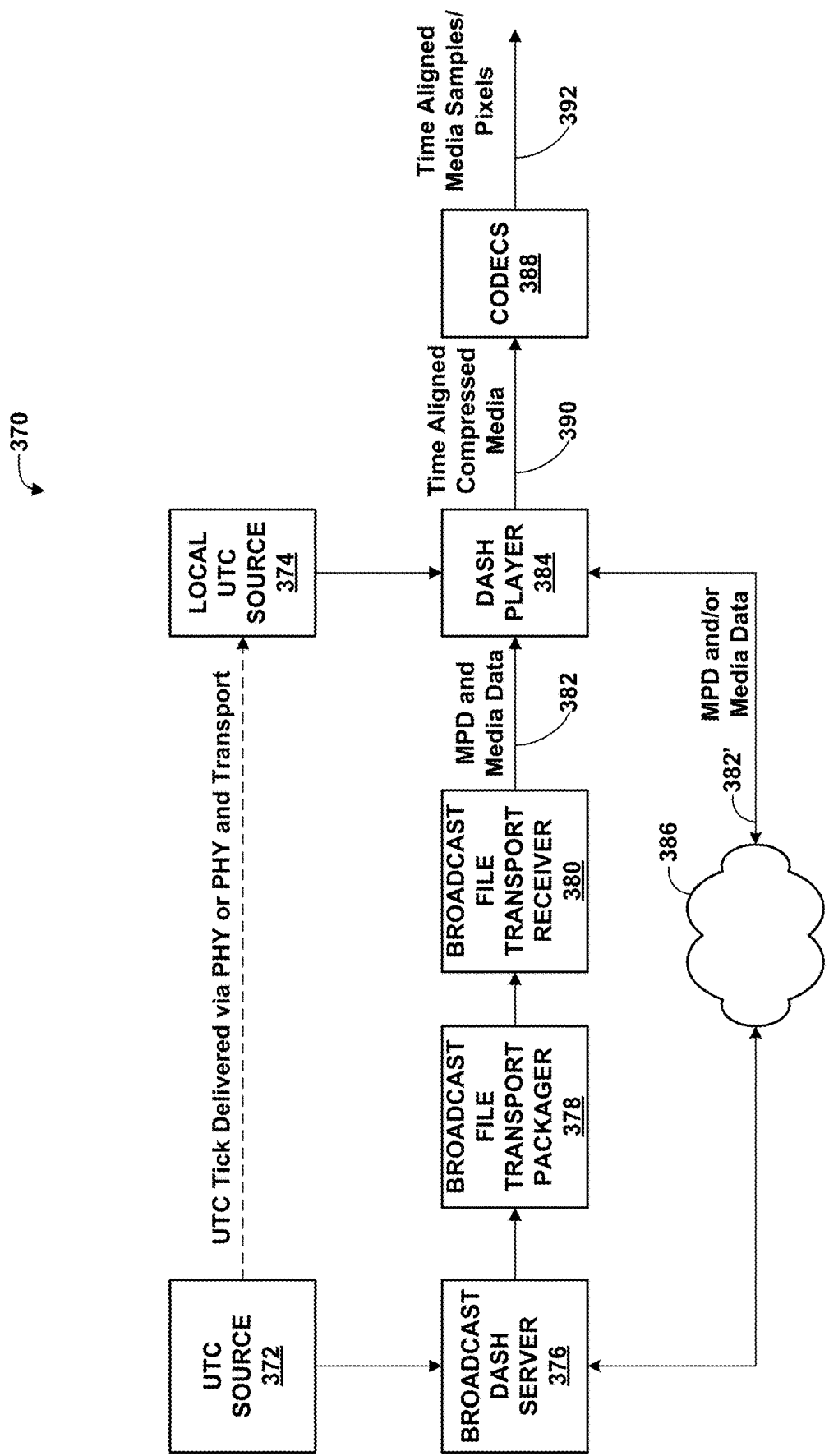
FIG. 11 is a conceptual diagram illustrating another example system in which the techniques of this disclosure may be implemented.

FIG. 11 is a conceptual diagram illustrating another example system 370 in which the techniques of this disclosure may be implemented. The example of FIG. 11 is conceptually similar to the example described with respect to FIG. 3. That is, in the example system 370 of FIG. 11, broadcast DASH server 376 provides media data to broadcast file transport packager 378, e.g., for broadcast delivery of files. For example, broadcast file transport packager 378 and broadcast file transport receiver 380 may operate according to File Delivery over Unidirectional Transport (FLUTE), as described in Paila et al., "FLUTE—File Delivery over Unidirectional Transport," Internet Engineering Task Force, RFC 6726, November 2012, available at tools.ietf.org/html/rfc6726. Alternatively, broadcast file transport packager 378 and broadcast file transport receiver 380 may operate according to Real-Time Object Delivery over Unidirectional Transport (ROUTE) protocol.

In still another example, broadcast file transport packager 378 and broadcast file transport receiver 380 may operate according to an over-the-air broadcast protocol, such as ATSC or NTSC. For example, an MBMS Service Layer may be combined with a DASH layer for ATSC 3.0. Such a combination may provide a layering-clean MBMS service layer implementation in an IP-centric manner. There may also be unified synchronization across multiple delivery paths and methods. Such a system may also provide clean, optimized support for DASH via broadcast, which may provide many benefits. Enhanced AL FEC support may provide constant quality of service (QoS) for all service components. Moreover, this example system may support various use cases and yield various benefits, such as fast channel change and/or low latency.

In the example of FIG. 11, broadcast DASH server 376 determines timing information using uniform time code (UTC) source 372, to determine when media data is to be transmitted. DASH player 384 ultimately receives an MPD and media data 382 from broadcast file transport receiver 380 using timing information provided by local UTC source 374. Alternatively, DASH player 384 may retrieve the MPD and media data 382' from CDN 386. DASH player 384 may extract time aligned compressed media data 390 and pass time aligned compressed media data 390 to CODECs 388 (which may represent audio decoder 46 and video decoder 48 of FIG. 1). CODECs 388 may then decode the encoded media data to produce time aligned media samples and pixels 392, which may be presented (e.g., via audio output 42 and video output 44 of FIG. 1).

Figure 12:
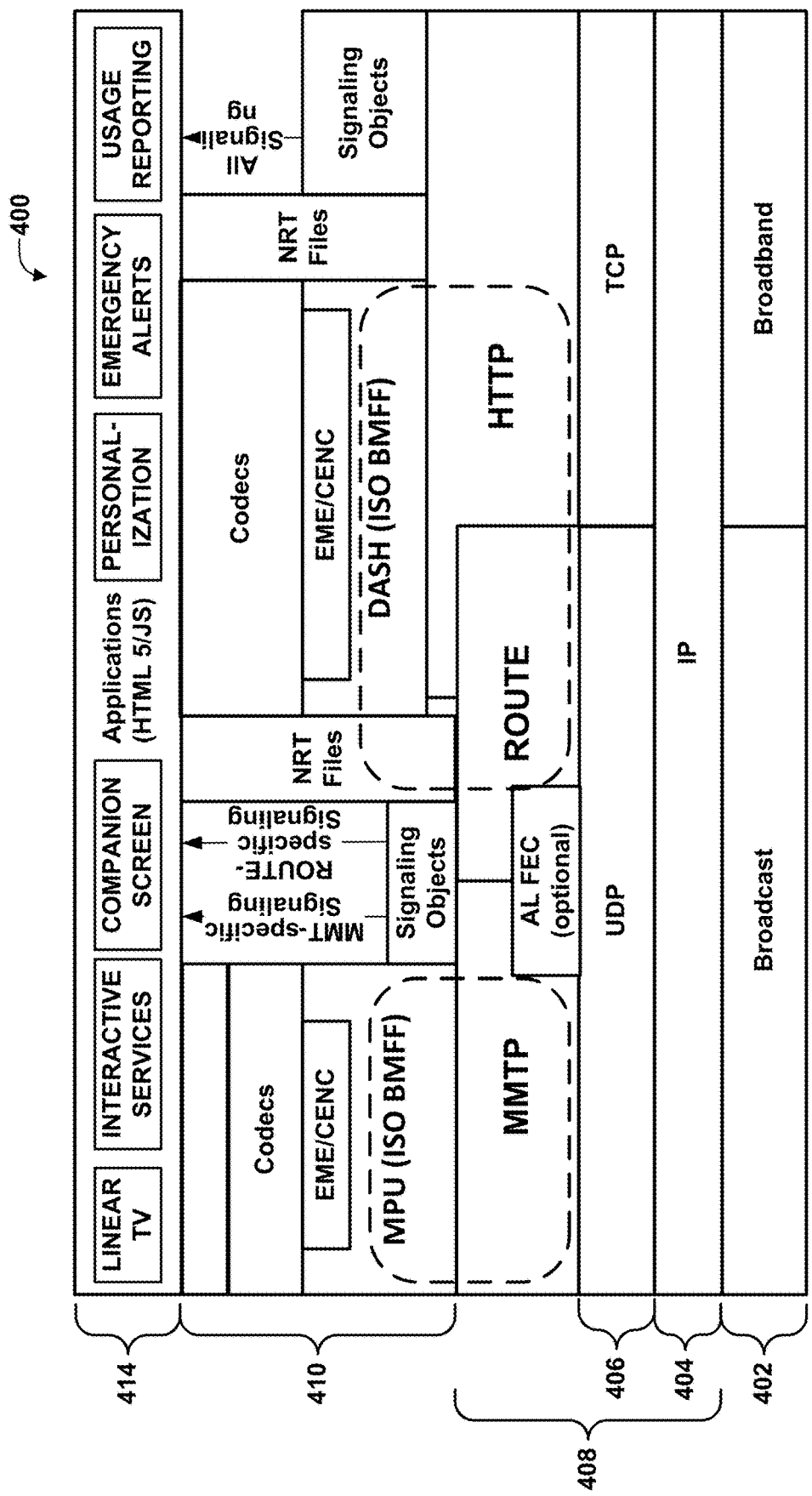
FIG. 12 is a conceptual diagram illustrating an example conceptual protocol model for ATSC 3.0.

FIG. 12 is a conceptual diagram illustrating an example conceptual protocol model 400 for ATSC 3.0. In model 400, linear and application based services 412 include linear TV, interactive services, companion screen, personalization, emergency alerts, and usage reporting, and may include other applications implemented using, e.g., HTML 5 and/or JavaScript.

Encoding, formatting, and service management data 410 of model 400 include various codecs (e.g., for audio and video data), ISO BMFF files, encryption using encrypted media extensions (EME) and/or common encryption (CENC), a media processing unit (MPU), NRT files, signaling objects, and various types of signaling data.

At delivery layer 408 of model 400, in this example, there is MPEG Media Transport Protocol (MMTP) data, ROUTE data, application layer forward error correction (AL FEC) data (which may be optional), Uniform Datagram Protocol (UDP) data and Transmission Control Protocol (TCP) data 406, Hypertext Transfer Protocol (HTTP) data, and Internet protocol (IP) data 404. This data may be transported using broadcast and/or broadband transmission via physical layer 402.

Figure 13A:
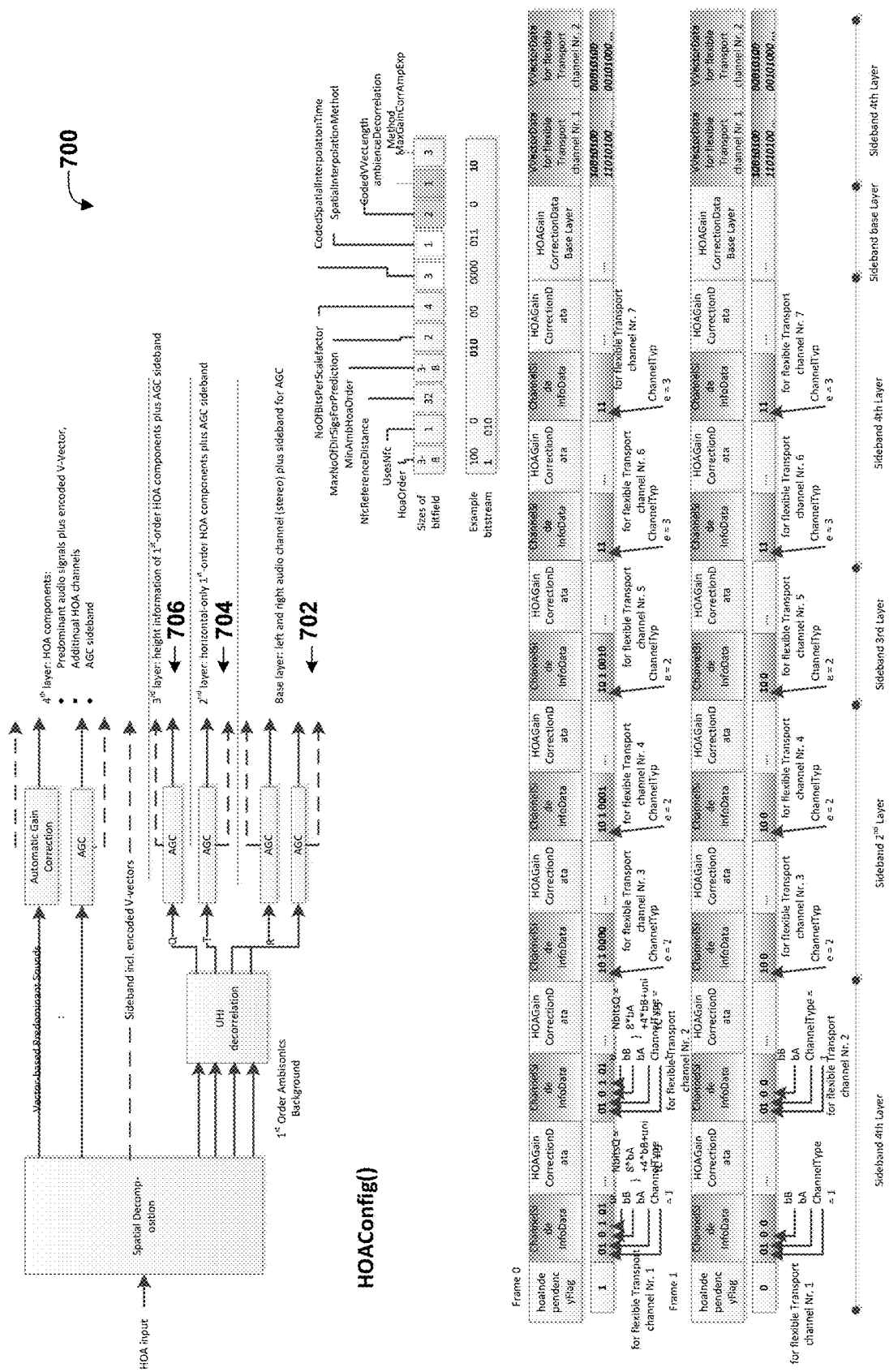
FIGS. 13A and 13B are conceptual diagrams representing examples of multi-layer audio data.

FIG. 13A is a conceptual diagram representing multi-layer audio data 700. While this example depicts a first layer having three sub-layers, in other examples, the three sub-layers may be three separate layers.

In the example of FIG. 13A, the first layer, which includes a base sub-layer 702, a first enhancement sub-layer 704, and a second enhancement sub-layer 706, of the two or more layers of higher order ambisonic audio data may comprise higher order ambisonic coefficients corresponding to one or more spherical basis functions having an order equal to or less than one. In some examples, the second layer (i.e., a third enhancement layer) comprises vector-based predominant audio data. In some examples, the vector-based predominant audio comprises at least a predominant audio data and an encoded V-vector, where the encoded V-vector is decomposed from the higher order ambisonic audio data through application of a linear invertible transform. U.S. Provisional Application 62/145,960, filed Apr. 10, 2015, and Herre et al., "MPEG-H 3D Audio—The New Standard for Coding of Immersive Spatial Audio," IEEE 9 Journal of Selected Topics in Signal Processing 5, August 2015, include additional information regarding V-vectors. In other examples, the vector-based predominant audio data comprises at least an additional higher order ambisonic channel. In still other examples, the vector-based predominant audio data comprises at least an automatic gain correction sideband. In other examples, the vector-based predominant audio data comprises at least a predominant audio data, an encoded V-vector, an additional higher order ambisonic channel, and an automatic gain correction sideband, where the encoded V-vector is decomposed from the higher order ambisonic audio data through application of a linear invertible transform.

In the example of FIG. 13A, the first layer 702 may comprise at least three sub-layers. In some example, a first sub-layer (i.e., the base layer 702) of the at least three sub-layers comprises at least high order ambisonic audio data associated with a left audio channel. In other examples, a first sub-layer (i.e., the base layer 702) of the at least three sub-layers comprises at least high order ambisonic audio data associated with a right audio channel. In still other examples, a first sub-layer (i.e., the base layer 702) of the at least three sub-layers comprises at least a sideband for automatic gain correction. In other examples, a first sub-layer (i.e., the base layer 702) of the at least three sub-layers comprises at least high order ambisonic audio data associated with a left audio channel and a right audio channel, and a sideband for automatic gain correction.

In some examples, a second sub-layer (i.e., the first enhancement layer 704) of the at least three sub-layers of FIG. 13A comprises at least higher order ambisonic audio data associated with a localization channel. In other examples, a second sub-layer (i.e., the first enhancement layer 704) of the at least three sub-layers comprises at least a sideband for automatic gain correction. In still other examples, a second sub-layer (i.e., the first enhancement layer 704) of the at least three sub-layers comprises at least higher order ambisonic audio data associated with a localization channel, and a sideband for automatic gain correction.

In some examples, a third sub-layer (i.e., the second enhancement layer 706) of the at least two sub-layers comprises at least higher order ambisonic audio data associated with a height channel. In other examples, a third sub-layer (i.e., the second enhancement layer 706) of the at least three sub-layers comprises at least a sideband for automatic gain correction. In still other examples, a third sub-layer (i.e., the second enhancement layer 706) of the at least three sub-layers comprises at least higher order ambisonic audio data associated with a height channel, and a sideband for automatic gain correction.

In the example of FIG. 13A where there exists four separate layers (i.e., the base layer 702, the first enhancement layer 704, the second enhancement layer 706, and the third enhancement layer), an audio coding device may perform error checking processes. In some examples, the audio coding device may perform an error checking process on the first layer (i.e., the base layer 702). In another example, the audio coding device may perform an error checking process on the first layer (i.e., the base layer 702) and refrain from performing an error checking process on the second layer, the third layer, and the fourth layer. In yet another example, the audio coding device may perform an error checking process on the first layer (i.e., the base layer 702), in response to determining that the first layer is error free, the audio coding device may perform an error checking process on the second layer (i.e., the first enhancement layer 704), and the audio coding device may refrain from performing an error checking process on the third layer and the fourth layer. In yet another example, the audio coding device may perform an error checking process on the first layer (i.e., the base layer 702), in response to determining that the first layer is error free, the audio coding device may perform an error checking process on the second layer (i.e., the first enhancement layer 704), in response to determining that the second layer is error free, the audio coding device may perform an error checking process on the third layer (i.e., the second enhancement layer), and the audio coding device may refrain from performing an error checking process on the fourth layer. In yet another example, the audio coding device may perform an error checking process on the first layer (i.e., the base layer 702), in response to determining that the first layer is error free, the audio coding device may perform an error checking process on the second layer (i.e., the first enhancement layer 704), in response to determining that the second layer is error free, the audio coding device may perform an error checking process on the third layer (i.e., the second enhancement layer 706), and, in response to determining that the third layer is error free, the audio coding device may perform an error checking process on the fourth layer (i.e., the third enhancement layer). In any of the above examples in which the audio coding device performs the error checking process on the first layer (i.e., the base layer 702), the first layer may be considered a robust layer that is robust to errors.

In accordance with the techniques of this disclosure, in one example, data from each of the various layers described above (e.g., the base layer 702, the second layer 704, the third layer 706, and the fourth layer) may be provided within respective adaptation sets. That is, a base layer adaptation set may include one or more representations that include data corresponding to the base layer 702, a second layer adaptation set may include one or more representations that include data corresponding to the second layer 704, a third layer adaptation set may include one or more representations that include data corresponding to the third layer 706, and a fourth layer adaptation set may include one or more representations that include data corresponding to the fourth layer.

Figure 13B:
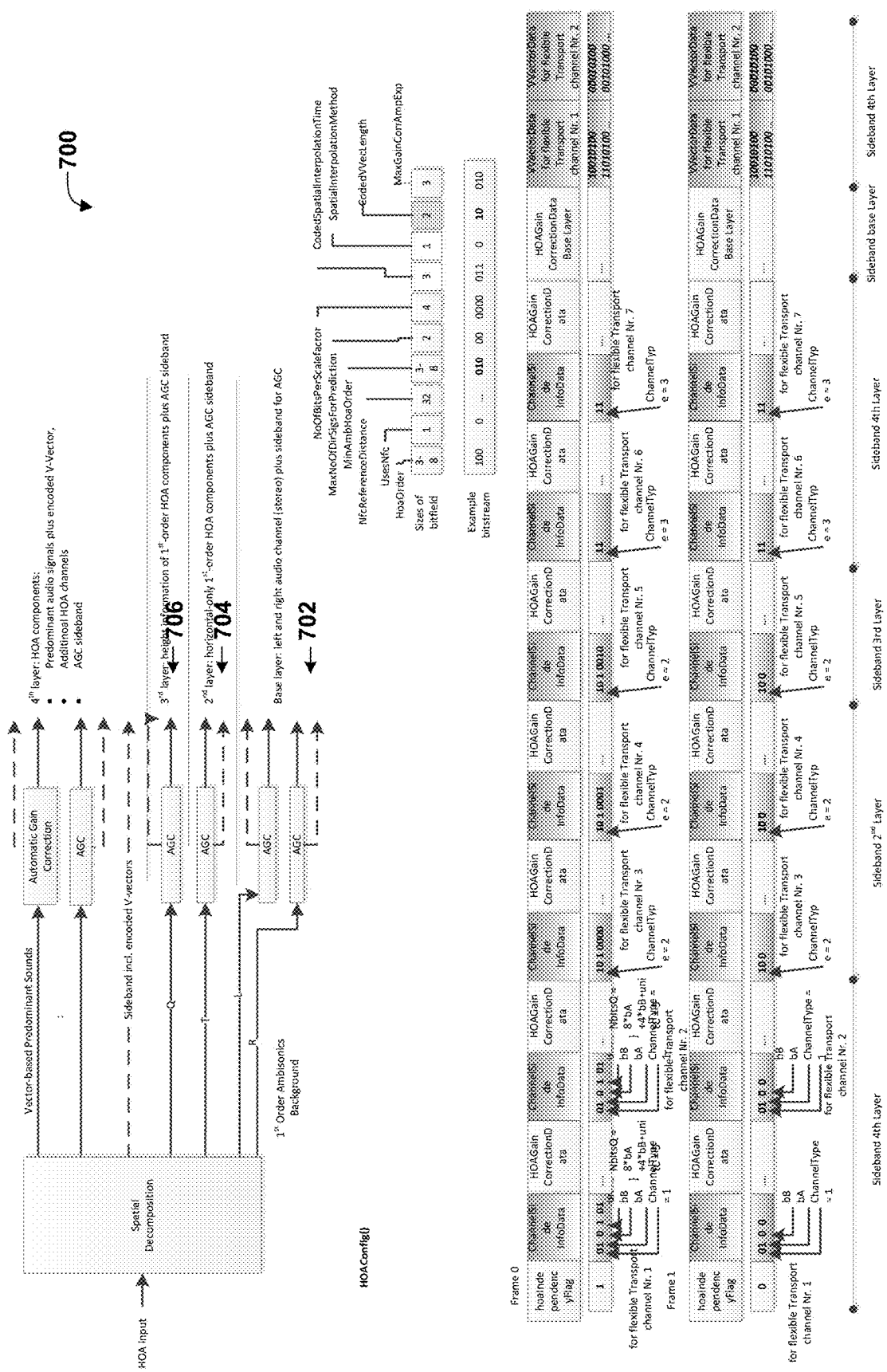

FIG. 13B is a conceptual diagram representing another example of multi-layer audio data. The example of FIG. 13B is substantially similar to the example of FIG. 13A. However, in this example, UHJ decorrelation is not performed.

FIG. 14A is a conceptual diagram illustrating another example of multi-layer audio data 710. While this example depicts a first layer having three sub-layers, in other examples, the three sub-layers may be three separate layers.

In the example of FIG. 14A, the first layer, which includes a base sub-layer 712, a first enhancement sub-layer and a second enhancement sub-layer, of the two or more layers of higher order ambisonic audio data may comprise higher order ambisonic coefficients corresponding to one or more spherical basis functions having an order equal to or less than one. In some examples, the second layer (i.e., a third enhancement layer) comprises vector-based predominant audio data. In some examples, the vector-based predominant audio comprises at least a predominant audio data and an encoded V-vector, where the encoded V-vector is decomposed from the higher order ambisonic audio data through application of a linear invertible transform. In other examples, the vector-based predominant audio data comprises at least an additional higher order ambisonic channel. In still other examples, the vector-based predominant audio data comprises at least an automatic gain correction sideband. In other examples, the vector-based predominant audio data comprises at least a predominant audio data, an encoded V-vector, an additional higher order ambisonic channel, and an automatic gain correction sideband, where the encoded V-vector is decomposed from the higher order ambisonic audio data through application of a linear invertible transform.

In the example of FIG. 14A, the first layer may comprise at least three sub-layers. In some examples, a first sub-layer (i.e., the base layer 712) of the at least three sub-layers comprises at least high order ambisonic audio data associated with a $0^{th}$ order ambisonic. In other examples, the first sub-layer (i.e., the base layer 712) of the at least three sub-layers comprises at least a sideband for automatic gain correction. In still other examples, the first sub-layer (i.e., the base layer 712) of the at least three sub-layers comprises at least high order ambisonic audio data associated with a 0th order ambisonic and a sideband for automatic gain correction.

In some examples, a second sub-layer (i.e., the first enhancement layer 714) of the at least three sub-layers comprises at least high order ambisonic audio data associated with an X component. In other examples, a second sub-layer (i.e., the first enhancement layer 714) of the at least three sub-layers comprises at least high order ambisonic audio data associated with a Y component. In other examples, a second sub-layer (i.e., the first enhancement layer 714) of the at least three sub-layers comprises at least a sideband for automatic gain correction. In still other examples, a second sub-layer (i.e., the first enhancement layer 714) of the at least three sub-layers comprises at least high order ambisonic audio data associated with an X component and a Y component, and a sideband for automatic gain correction.

In some examples, a third sub-layer (i.e., the second enhancement layer 716) of the at least three sub-layers comprises at least high order ambisonic audio data associated with a Z component. In other examples, a third sub-layer (i.e., the second enhancement layer 716) of the at least three sub-layers comprises at least a sideband for automatic gain correction. In still other examples, a third sub-layer (i.e., the second enhancement layer 716) of the at least three sub-layers comprises at least high order ambisonic audio data associated with a Z component, and a sideband for automatic gain correction.

In the example of FIG. 14A where there exists four separate layers (i.e., the base layer 712, the first enhancement layer 714, the second enhancement layer 716 and the third enhancement layer), an audio coding device may perform error checking processes. In some examples, the audio coding device may perform an error checking process on the first layer (i.e., the base layer 712). In another example, the audio coding device may perform an error checking process on the first layer (i.e., the base layer 712) and refrain from performing an error checking process on the second layer, the third layer, and the fourth layer. In yet another example, the audio coding device may perform an error checking process on the first layer (i.e., the base layer 712), in response to determining that the first layer is error free, the audio coding device may perform an error checking process on the second layer (i.e., the first enhancement layer 714), and the audio coding device may refrain from performing an error checking process on the third layer and the fourth layer. In yet another example, the audio coding device may perform an error checking process on the first layer (i.e., the base layer 712), in response to determining that the first layer is error free, the audio coding device may perform an error checking process on the second layer (i.e., the first enhancement layer 714), in response to determining that the second layer is error free, the audio coding device may perform an error checking process on the third layer (i.e., the second enhancement layer 716), and the audio coding device may refrain from performing an error checking process on the fourth layer. In yet another example, the audio coding device may perform an error checking process on the first layer (i.e., the base layer 712), in response to determining that the first layer is error free, the audio coding device may perform an error checking process on the second layer (i.e., the first enhancement layer 714), in response to determining that the second layer is error free, the audio coding device may perform an error checking process on the third layer (i.e., the second enhancement layer 716), and, in response to determining that the third layer is error free, the audio coding device may perform an error checking process on the fourth layer (i.e., the third enhancement layer). In any of the above examples in which the audio coding device performs the error checking process on the first layer (i.e., the base layer 712), the first layer may be considered a robust layer that is robust to errors.

In accordance with the techniques of this disclosure, in one example, data from each of the various layers described above (e.g., the base layer 712, the second layer, the third layer, and the fourth layer) may be provided within respective adaptation sets. That is, a base layer 712 adaptation set may include one or more representations that include data corresponding to the base layer 712, a second layer adaptation set may include one or more representations that include data corresponding to the second layer 714, a third layer adaptation set may include one or more representations that include data corresponding to the third layer 716, and a fourth layer adaptation set may include one or more representations that include data corresponding to the fourth layer.

FIG. 14B is a conceptual diagram representing another example of multi-layer audio data. The example of FIG. 14B is substantially similar to the example of FIG. 14A. However, in this example, mode matrix decorrelation is not performed.

Figure 15:
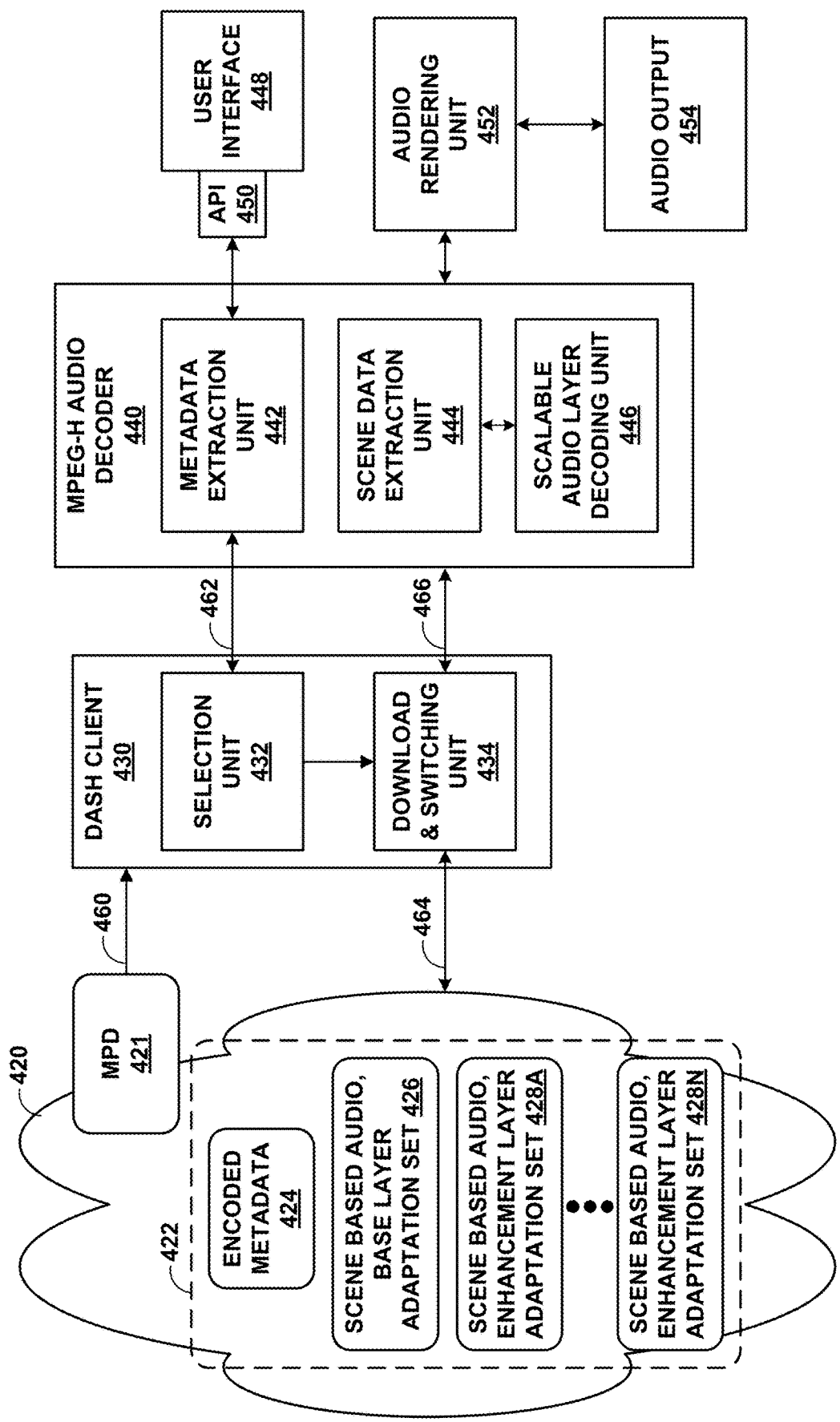
FIG. 15 is a block diagram illustrating another example system in which scalable HOA data is transferred in accordance with the techniques of this disclosure.

FIG. 15 is a block diagram illustrating another example system in which scalable HOA data is transferred in accordance with the techniques of this disclosure. In general, the elements of FIG. 15 are substantially similar to the elements of FIGS. 8 and 9. That is, FIG. 15 illustrates a system including MPEG-H audio decoder 440, which interacts with DASH client 430 to retrieve audio data from a content delivery network. Elements of FIG. 15 that are similarly named to elements of FIGS. 8 and 9 are generally configured the same as those elements as discussed above. However, in this example, multiple adaptation sets are provided that each correspond to a layer (or sub-layer) of scene based audio data, e.g., as discussed above with respect to FIGS. 13A, 13B, 14A, and 14B.

In particular, CDN 420 in this example provides scene based scalable audio content 422, which includes encoded metadata 424 for media content including a base layer of scene based audio (in the form of scene based audio, base layer adaptation set 426), and a plurality of enhancement layers (in the form of scene based audio, enhancement layer adaptation sets 428A-428N (adaptation sets 428)). For example, the base layer may include mono audio data, a first enhancement layer may provide left/right information, a second enhancement layer may provide front/back information, and a third enhancement layer may provide height information. The media content is described by MPD 421.

Accordingly, a user may indicate which types of information are needed via user interface 448. User interface 448 may include any of a variety of input and/or output interfaces, such as a display, a keyboard, a mouse, a touchpad, a touchscreen, a trackpad, a remote control, a microphone, buttons, dials, sliders, switches, or the like. For example, if only a single speaker is available, DASH client 430 may retrieve data only from scene based audio, base layer adaptation set 426. However, if multiple speakers are available, depending on an arrangement of the speakers, DASH client 430 may retrieve any or all of left/right information, front/back information, and/or height information from corresponding ones of scene based audio, enhancement layer adaptation sets 428.

Two example types of scalability for audio data in DASH are described below. A first example is static device scalability. In this example, a base layer and enhancement layers represent different source signals. For example, the base layer may represent 1080p 30 fps SDR and an enhancement layer may represent 4K 60 fps HDR. The main reason for this is to support access to lower quality for device adaptation, e.g., the base layer is selected by one device class and the enhancement layer by a second device class. In the example of static device scalability, the base layer and the enhancement layers are provided in different adaptation sets.

That is, devices may select one or more of the adaptation sets (e.g., by acquiring data from complementary representations in different adaptation sets).

A second example pertains to dynamic access bandwidth scalability. In this example, one base layer and one or more enhancement layers are generated. However, all layers present the same source signal (e.g., 1080p 60 fps). This may support adaptive streaming, e.g., according to the techniques of DASH. That is, based on an estimated available amount of bandwidth, more or less of the enhancement layers may be downloaded/accessed. In this example, the base layer and the enhancement are provided in one adaptation set and are seamlessly switchable. This example may pertain more to unicast delivery than broadcast/multicast delivery.

A third example may include a combination of the static device scalability and dynamic access bandwidth scalability techniques.

Each of these examples can be supported using DASH.

In the example of FIG. 15, DASH client 430 initially receives MPD 421 (460). Selection unit 432 determines available adaptation sets, and representations within the adaptation sets. Then selection unit 432 provides data representative of the available adaptation sets (in particular, available scalable audio layers) to metadata extraction unit 442 of MPEG-H audio decoder 440 (462). A user or other entity provides selections of the desired audio layers to MPEG-H audio decoder 440 via API 450, in this example. These selections are then passed to selection unit 432. Selection unit 432 informs download & switching unit 434 of the desired adaptation sets, as well as initial representation selections (e.g., based on available network bandwidth).

Download & switching unit 434 then retrieves data from one representation of each of the desired adaptation sets (464), e.g., by submitting HTTP GET or partial GET requests to a server of CDN 420. After receiving the requested data, download & switching unit 434 provides the retrieved data to MPEG-H audio decoder 440 (466). Scene data extraction unit 444 extracts the relevant scene data, and scalable audio layer decoding unit 446 decodes the audio data for each of the various layers. Ultimately, MPEG-H audio decoder 440 provides the decoded audio layers to audio rendering unit 452, which renders the audio data for playback by audio output 454. Audio output 454 may generally correspond to audio output 42 of FIG. 1. For example, audio output 454 may include one or more speakers in a variety of arrangements. For instance, audio output 454 may include a single speaker, left and right stereo speakers, 5.1 arranged speakers, 7.1 arranged speakers, or speakers at various heights to provide 3D audio.

In general, the various techniques discussed above with respect to FIGS. 8 and 9 may also be performed by the system of FIG. 15.

Figure 16:
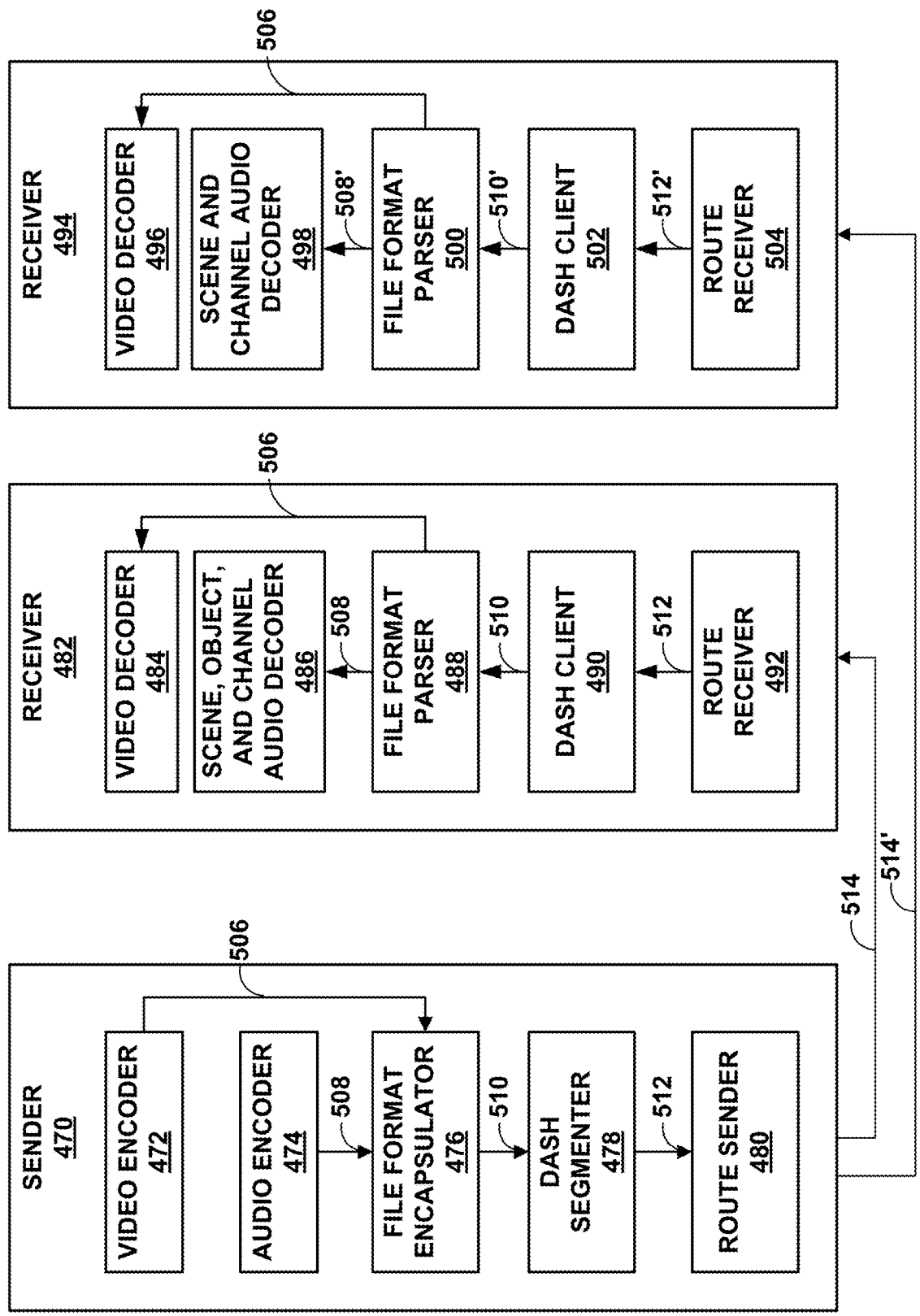
FIG. 16 is a conceptual diagram illustrating an example architecture in accordance with the techniques of this disclosure.

FIG. 16 is a conceptual diagram illustrating an example architecture in accordance with the techniques of this disclosure. The example of FIG. 16 includes sender 470 and two receivers, Receiver 482 and Receiver 494.

Sender 470 includes video encoder 472 and audio encoder 474. Video encoder 472 encodes video data 506 while audio encoder 474 encodes audio data 508. Sender 470 in this example may prepare a plurality of representations, e.g., three audio representations, Representation 1, Representation 2, and Representation 3. Thus, encoded audio data 508 may include audio data for each of Representation 1, Representation 2, and Representation 3. File format encapsulator 476 receives encoded video data 506 and encoded audio data 508 and forms encapsulated data 510. DASH segmenter 478 forms segments 512, each of segments 512 including separate sets of encapsulated, encoded audio or video data. ROUTE sender 480 sends the segments in various corresponding bitstreams. In this example, bitstream 514 includes all audio data (e.g., each of Representations 1, 2, and 3), whereas bitstream 514' includes Representations 1 and 3 but omits Representation 2.

Receiver 482 includes video decoder 484, scene, object, and channel audio decoder 486, file format parser 488, DASH client 490, and ROUTE receiver 492, while receiver 494 includes video decoder 496, scene and channel audio decoder 498, file format parser 500, DASH client 502, and ROUTE receiver 504.

Ultimately, in this example, receiver 482 receives bitstream 514 including data for each of Representation 1, Representation 2, and Representation 3. However, receiver 494 receives bitstream 514' including data for Representation 1 and Representation 3. This may be because network conditions between the sender and receiver 494 do not provide a sufficient amount of bandwidth to retrieve data for all three available representations, or because a rendering device coupled to receiver 494 is not capable of using data from Representation 2. For example, if Representation 2 includes height information for audio data, but receiver 494 is associated with a left/right stereo system, then data from Representation 2 may be unnecessary for rendering audio data received via receiver 494.

In this example, ROUTE receiver 492 receives bitstream 514, and caches received segments locally until DASH client 490 requests the segments. DASH client 490 may request the segments when segment availability information indicates that the segments are (or should be) available, e.g., based on advertised wall-clock times. DASH client 490 may then request the segments from ROUTE receiver 492. DASH client 490 may send the segments 510 to file format parser 488. File format parser 488 may decapsulate the segments and determine whether the decapsulated data corresponds to encoded audio data 508 or encoded video data 506. File format parser 488 delivers encoded audio data 508 to scene, object, and channel audio decoder 486 and encoded video data 506 to video decoder 484.

In this example, ROUTE receiver 504 receives bitstream 514', and caches received segments locally until DASH client 502 requests the segments. DASH client 502 may request the segments when segment availability information indicates that the segments are (or should be) available, e.g., based on advertised wall-clock times. DASH client 502 may then request the segments from ROUTE receiver 504. DASH client 502 may send the segments 510' to file format parser 5070. File format parser 500 may decapsulate the segments and determine whether the decapsulated data corresponds to encoded audio data 508' (which omits Representation 2, as discussed above) or encoded video data 506. File format parser 500 delivers encoded audio data 508' to scene and channel audio decoder 498 and encoded video data 506 to video decoder 496.

The techniques of this disclosure may be applied in a variety of use cases. For example, the techniques of this disclosure may be used to provide device scalability for two or more different receivers. As another example, object flows and/or flows for different scalable audio layers may be carried by different transport session. As yet another example, the techniques may support backward compatibility, in that a legacy receiver may retrieve only the base layer whereas an advanced receiver may access the base layer and one or more enhancement layers. Furthermore, as discussed above, broadband, broadcast/multicast, and/or unicast reception of media data may be combined to support enhanced quality (which may be described as hybrid scalability). Moreover, these techniques may support future technologies, such as 8K signals and HDR extension layers, scalable audio, and/or combinations of real-time base layer and NRT enhancement layer techniques. Each of these use cases can be supported by DASH/ROUTE due to functional separation throughout the stack.

In this manner, FIG. 16 represents examples of devices (receivers 482, 494) for retrieving audio data, the devices including one or more processors configured to receive availability data representative of a plurality of available adaptation sets, the available adaptation sets including a scene-based audio adaptation set and one or more object-based audio adaptation sets, receive selection data identifying which of the scene-based audio adaptation set and the one or more object-based audio adaptation sets are to be retrieved, and provide instruction data to a streaming client to cause the streaming client to retrieve data for each of the adaptation sets identified by the selection data; and a memory configured to store the retrieved data for the audio adaptation sets.

Figure 17:
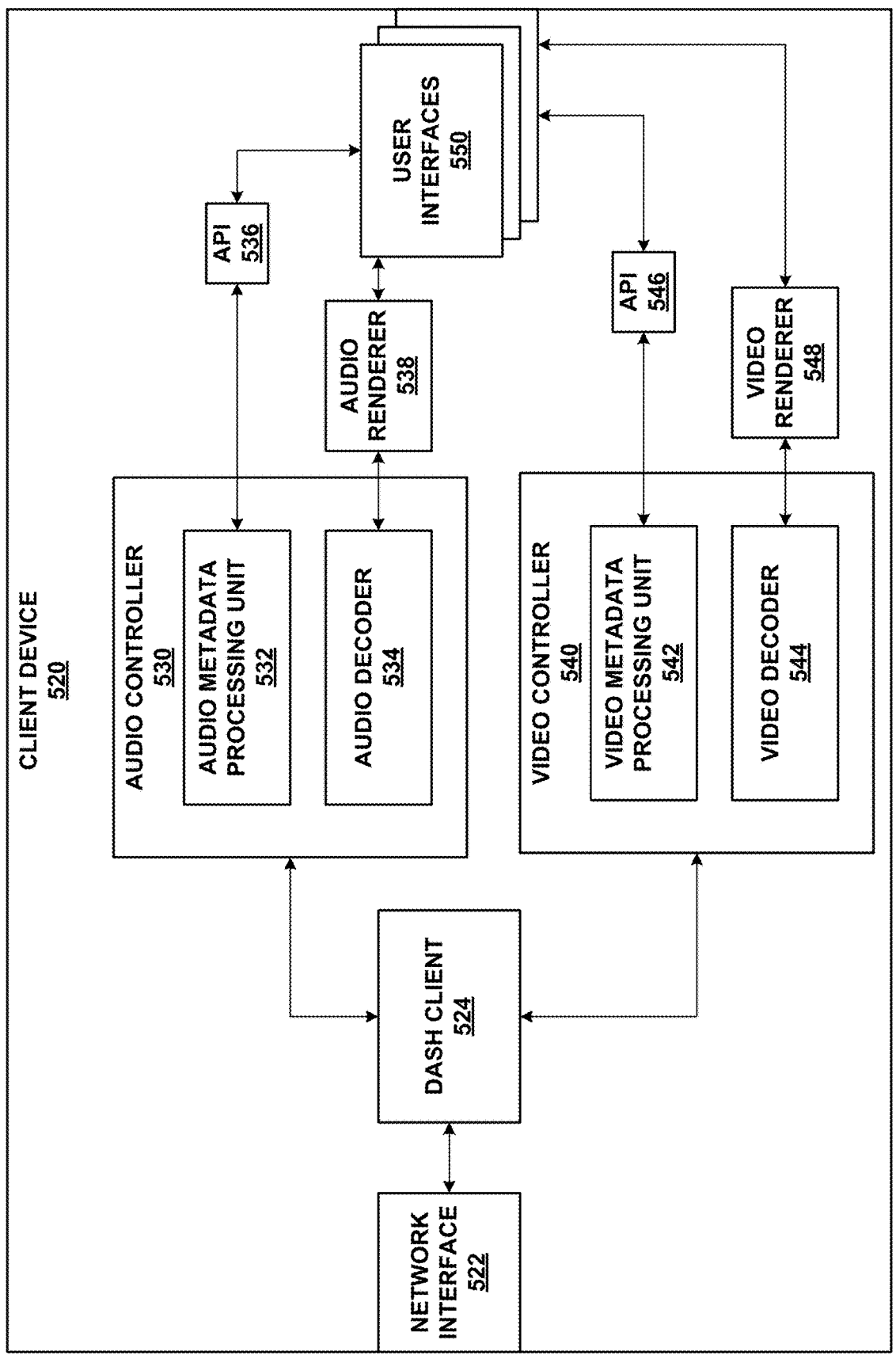
FIG. 17 is a block diagram illustrating an example client device in accordance with the techniques of this disclosure.

FIG. 17 is a block diagram illustrating an example client device 520 in accordance with the techniques of this disclosure. Client device 520 includes network interface 522, which generally provides connectivity to a computer-based network, such as the Internet. Network interface 522 may comprise, for example, one or more network interface cards (NICs), which may operate according to a variety of network protocols, such as Ethernet and/or one or more wireless network standards, such as IEEE 802.11a, b, g, n, or the like.

Client device 520 also includes DASH client 524. DASH client 524 generally implements DASH techniques. Although in this example, client device 520 includes DASH client 524, in other examples, client device 520 may include a middleware unit in addition to DASH client 524, e.g., as discussed above with respect to FIG. 2. In general, DASH client 524 selects appropriate representations from one or more adaptation sets of media content, e.g., as directed by audio controller 530 and video controller 420, as discussed below.

Client device 520 includes audio controller 530 and video controller 420 for controlling selection of audio and video data, respectively. Audio controller 530 generally operates in accordance with the techniques of this disclosure, as discussed above. For example, audio controller 530 may be configured to receive metadata (e.g., from an MPD or other data structure, such as from MPEG-H metadata) representative of available audio data. The available audio data may include scene-based audio, channel-based audio, object-based audio, or any combination thereof. Moreover, as discussed above, the scene-based audio may be scalable, i.e., have multiple layers, which may be provided in separate respective adaptation sets. In general, audio metadata processing unit 532 of audio controller 530 determines which types of audio data are available.

Audio metadata processing unit 532 interacts with API 536, which provides an interface between one or more of user interfaces 550 and audio metadata processing unit 532. For example, user interfaces 550 may include one or more of a display, one or more speakers, a keyboard, a mouse, a pointer, a track pad, a touchscreen, a remote control, a microphone, switches, dials, sliders, or the like, for receiving input from a user and for providing audio and/or video output to a user. Thus, a user may select desired audio and video data via user interfaces 550.

For example, the user may connect one or more speakers to client device 520 in any of a variety of configurations. Such configurations may include a single speaker, stereo speakers, 3.1 surround, 5.1 surround, 7.1 surround, or speakers at multiple heights and locations for 3D audio. Thus, the user may provide an indication of a speaker arrangement to client device 520 via user interfaces 550. Similarly, the user may provide a selection of a video configuration, e.g., two-dimensional video, three-dimensional video, or multi-dimensional video (e.g., three-dimensional video with multiple perspectives). User interfaces 550 may interact with video controller 420 via API 426, which provides an interface to video metadata processing unit 422 in a manner that is substantially similar to API 536.

Accordingly, audio metadata processing unit 532 may select appropriate adaptation sets from which audio data is to be retrieved, while video metadata processing unit 422 may select appropriate adaptation sets from which video data is to be retrieved. Audio metadata processing unit 532 and video metadata processing unit 422 may provide indications of adaptation sets from which audio and video data are to be retrieved to DASH client 524. DASH client 524, in turn, selects representations of the adaptation sets and retrieves media data (audio or video data, respectively) from the selected representations. DASH client 524 may select the representations based on, for example, available network bandwidth, priorities for the adaptation sets, or the like. DASH client 524 may submit HTTP GET or partial GET requests for the data via network interface 522 from the selected representations, and in response to the requests, receive the requested data via network interface 522. DASH client 524 may then provide the received data to audio controller 530 or video controller 420.

Audio decoder 534 decodes audio data received from DASH client 524 and video decoder 424 decodes video data received from DASH client 524. Audio decoder 534 provides decoded audio data to audio renderer 538, while video decoder 424 provides decoded video data to video renderer 428. Audio renderer 538 renders the decoded audio data, and video renderer 428 renders the decoded video data. Audio renderer 538 provides the rendered audio data to user interfaces 550 for presentation, while video renderer 428 provides the rendered video data to user interfaces 550 for presentation.

In this manner, FIG. 17 represents an example of a device for retrieving audio data, the device including one or more processors configured to receive availability data representative of a plurality of available adaptation sets, the available adaptation sets including a scene-based audio adaptation set and one or more object-based audio adaptation sets, receive selection data identifying which of the scene-based audio adaptation set and the one or more object-based audio adaptation sets are to be retrieved, and provide instruction data to a streaming client to cause the streaming client to retrieve data for each of the adaptation sets identified by the selection data; and a memory configured to store the retrieved data for the audio adaptation sets.

Figure 18:
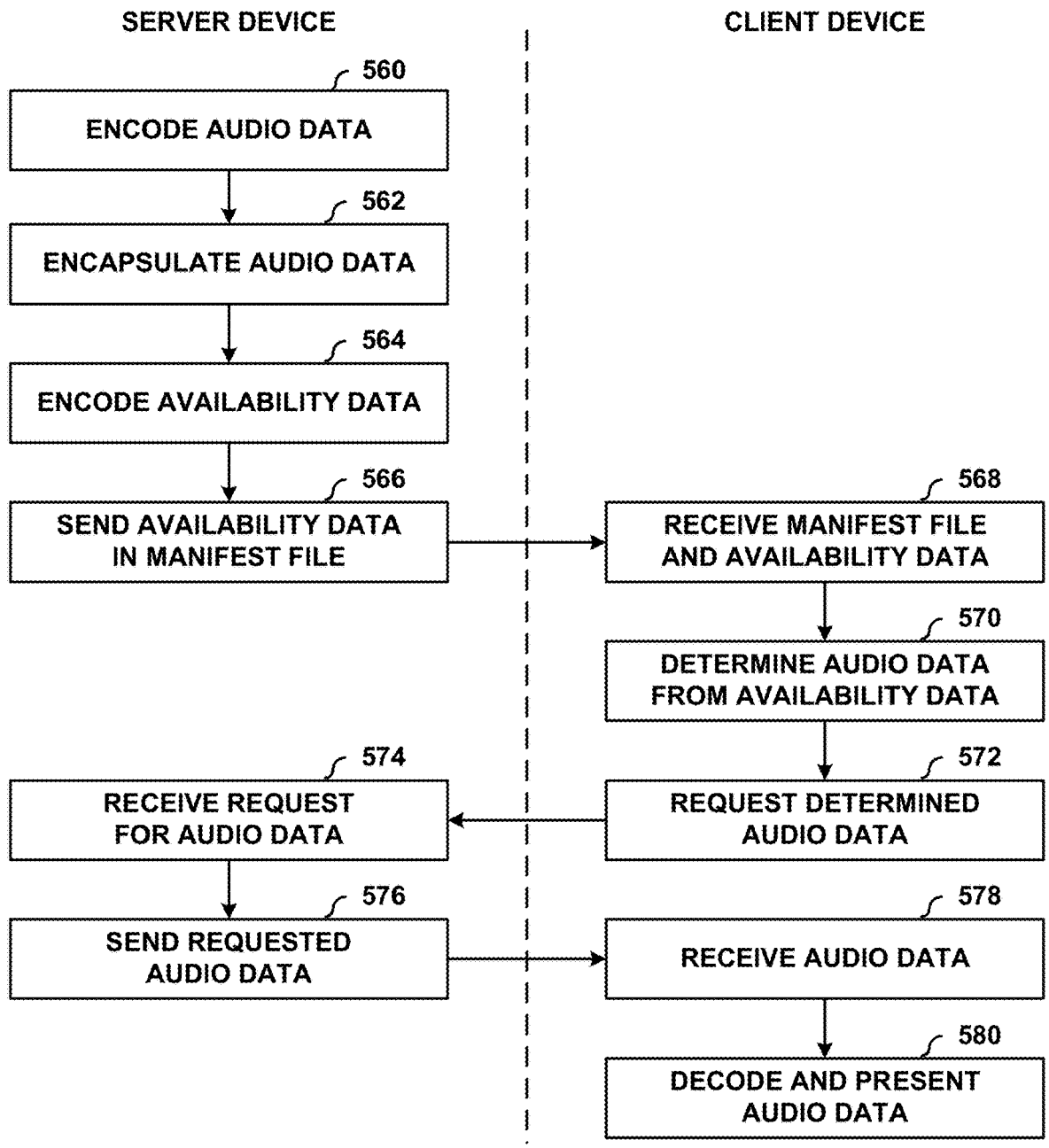
FIG. 18 is a flowchart illustrating an example method for performing the techniques of this disclosure.

FIG. 18 is a flowchart illustrating an example method for performing the techniques of this disclosure. In this example, the method is explained with respect to a server device and a client device. For purposes of example and explanation, actions of the server device are discussed with respect to server device 60 (FIG. 1), and actions of the client device are discussed with respect to client device 40 (FIG. 1). However, it should be understood that other server and client devices may be configured to perform the discussed functionality.

Initially, server device 60 encodes audio data (560). For example, audio encoder 26 (FIG. 1), MPEG-H audio encoder 212 (FIGS. 5-7), or audio encoder 474 (FIG. 16) encodes audio data, such as scene audio data, channel audio data, scalable audio data, and/or object audio data. Server device 60 also encapsulates the audio data (562), e.g., into a file format to be used for streaming the audio data, such as ISO BMFF. In particular, encapsulation unit 30 (FIG. 1), multiplexer 216 (FIGS. 5, 6), broadcast file transport packager 378 (FIG. 11), or file format encapsulator 476 (FIG. 16) encapsulates the encoded audio data into transportable files, such as segments formatted according to, e.g., ISO BMFF. Server device 60 also encodes availability data (564). The availability data may be included in a manifest file, such as an MPD of DASH. The availability data itself may be formatted according to an audio encoding format, such as MPEG-H 3D Audio. Thus, server device 60 may send the availability data in a manifest file to client device 40 (566).

Client device 40 may receive the manifest file and, thus, the availability data (568). As discussed in greater detail below, a DASH client of client device 40 may receive the manifest file and extract the availability data. However, because the availability data may be formatted according to an audio encoding format, such as MPEG-H 3D Audio, the DASH client may send the availability data to an MPEG-H 3D Audio decoder (such as audio decoder 46 of FIG. 1). Client device 40 may then determine audio data to be retrieved from the availability data (570). For example, as discussed below, the DASH client may receive instruction data from, e.g., the MPEG-H 3D Audio decoder (such as audio decoder 46 of FIG. 1) indicating adaptation sets from which to retrieve media data. Client device 40 may then request the determined audio data according to the instruction data (572).

In one example, client device 40 may request audio data from all available audio adaptation sets, but request only audio data from lowest-bitrate representations of unselected adaptation sets (that is, adaptation sets not identified by selection data of instruction data received from, e.g., the MPEG-H 3D Audio decoder). In this example, client device 40 may perform bandwidth adaptation for selected adaptation sets. In this manner, if a user selection changes, client device 40 immediately has access to at least some audio data, and may begin performing bandwidth adaptation for newly-selected adaptation sets (e.g., retrieving audio data from higher bitrate representations for the newly-selected adaptation sets).

In another example, client device 40 may simply only request audio data from selected adaptation sets, and avoid requesting any audio data for unselected adaptation sets.

In any case, server device 60 may receive the request for audio data (574). Server device 60 may then send the requested audio data to client device 40 (576). Alternatively, in another example, server device 60 may transmit audio data via network broadcast or multicast, or over-the-air broadcast, to client device 40, and client device 40 may request the selected adaptation set data from a middleware unit (e.g., eMBMS middleware unit 100 of FIG. 2).

Client device 40 may receive the audio data (578). For example, the DASH client may receive the requested audio data. Client device 40 may also decode and present the audio data (580). Decoding may be performed by audio decoder 46 (FIG. 1), MPEG-H Audio Decoder 220 (FIGS. 5-8), MPEG-H Audio decoder 220' (FIG. 9), CODECs 388 (FIG. 11), MPEG-H Audio Decoder 440 (FIG. 15), scene, object, and channel audio decoder 486 (FIG. 16), scene and channel audio decoder 498 (FIG. 16), or audio decoder 534 (FIG. 17), while presentation may be performed by audio output 42 (FIG. 1), audio rendering unit 232 (FIGS. 5-9), audio output 454 (FIG. 15), or user interfaces 550 (FIG. 17).

Figure 19:
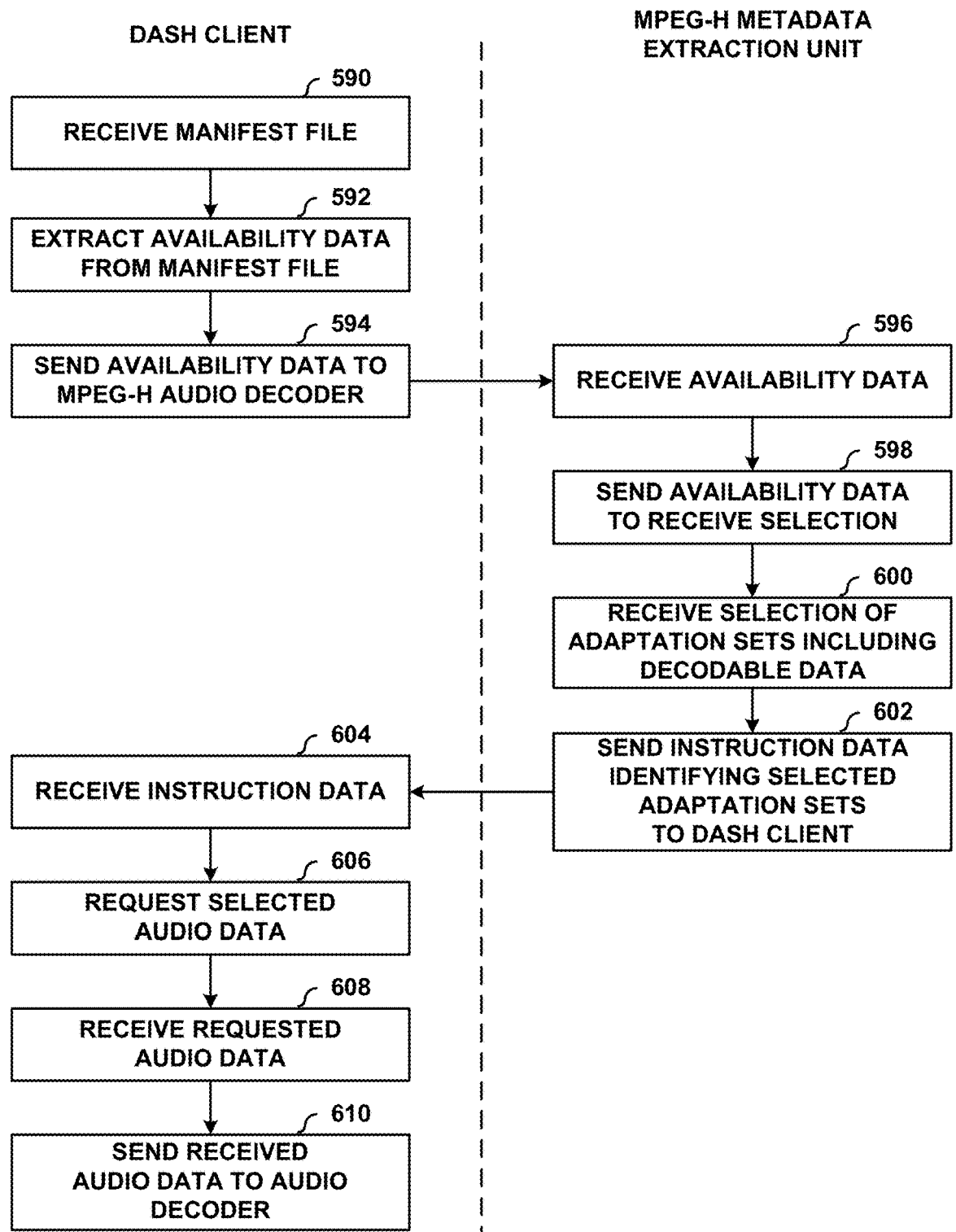
FIG. 19 is a flowchart illustrating another example method for performing the techniques of this disclosure.

FIG. 19 is a flowchart illustrating another example method for performing the techniques of this disclosure. In this example, the method is described as being performed by a DASH client and an MPEG-H metadata extraction unit. The example method of FIG. 19 is discussed with respect to DASH client 280 (FIG. 8) and metadata extraction unit 222 (FIG. 8) for purposes of example. However, it should be understood that other examples may be performed. For example, the metadata extraction unit may be separate from an MPEG-H audio decoder, as shown in the example of FIG. 9.

Initially, in this example, DASH client 280 receives a manifest file (590). The manifest file may comprise, for example, an MPD file of DASH. DASH client 280 may then extract availability data from the manifest file (592). The availability data may be formatted according to MPEG-H 3D Audio. Therefore, DASH client 280 may send the availability data to metadata extraction unit 222 (594).

Metadata extraction unit 222 may receive the availability data (596). Metadata extraction unit may extract the availability data, which may indicate what types of audio data are available (e.g., scene, channel, object, and/or scalable audio data) and send indications of these available sets of data for presentation to a user to receive selection data indicating a selection of which sets of audio data are to be retrieved (598). In response to the selection data, metadata extraction unit 222 may receive a selection of adaptation sets including decodable data to be retrieved (600). In particular, metadata extraction unit 222 may receive a selection of the types of audio data to be retrieved, and determine (using the availability data) a mapping between the selected types of audio data and the corresponding adaptation sets. Metadata extraction unit 222 may then send instruction data indicating adaptation sets from which audio data is to be retrieved to DASH client 280 (602).

Accordingly, DASH client 280 may receive the instruction data (604). DASH client 280 may then request the selected audio data (606). For example, DASH client 280 may retrieve relatively high quality sets of audio data (e.g., using bandwidth adaptation techniques) for the selected audio adaptation sets, and relatively low-quality or lowest available bitrate representations for the unselected audio adaptation sets. Alternatively, DASH client 280 may only retrieve audio data for the selected audio adaptation sets, and not retrieve any audio data for the unselected audio adaptation sets.

In some examples, DASH client 280 may receive indications of relative quality levels for the selected audio adaptation sets. For example, the relative quality levels that compare the relative quality of one adaptation set to another. In this example, if one adaptation set has a higher relative quality value than another as indicated by the selection data, DASH client 280 may prioritize retrieving audio data from a relatively higher bitrate representation for the adaptation set having the higher relative quality value.

In any case, DASH client 280 may then receive the requested audio data (608). For example, DASH client 280 may receive the requested audio data from an external server device (e.g., if the requests were unicast requests sent to the external server device), or from a middleware unit (e.g., if the middleware unit initially received the audio data, and cached the received audio data for subsequent retrieval by DASH client 280). DASH client 280 may then send the received audio data to an MPEG-H audio decoder (610). The MPEG-H audio decoder may include metadata extraction unit 222 (as shown in the example of FIG. 8) or be separate from metadata extraction unit 222' (as shown in the example of FIG. 9).

In this manner, the method of FIG. 19 represents an example of a method of retrieving audio data including receiving availability data representative of a plurality of available adaptation sets, the available adaptation sets including a scene-based audio adaptation set and one or more object-based audio adaptation sets, receiving selection data identifying which of the scene-based audio adaptation set and the one or more object-based audio adaptation sets are to be retrieved, and providing instruction data to a streaming client to cause the streaming client to retrieve data for each of the adaptation sets identified by the selection data.

In one or more examples, the functions described may be implemented in hardware, software, firmware, or any combination thereof. If implemented in software, the functions may be stored on or transmitted over as one or more instructions or code on a non-transitory computer-readable medium and executed by a hardware-based processing unit. Non-transitory Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such non-transitory computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a non-transitory computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that non-transitory computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving audio data, the method comprising:
receiving availability data representative of a plurality of available adaptation sets, the available adaptation sets including one or more scene-based audio adaptation sets and one or more object-based audio adaptation sets, the object-based audio adaptation sets including audio data for audio objects and metadata representing location coordinates for the audio objects, and the one or more scene-based audio adaptation sets including audio data representing a soundfield using spherical harmonic coefficients and comprising one or more scalable audio adaptation sets, each of the one or more scalable audio adaptation sets corresponding to respective layers of scalable audio data;
receiving selection data identifying which of the scene-based audio adaptation sets and the one or more object-based audio adaptation sets are to be retrieved; and
providing instruction data to a streaming client to cause the streaming client to retrieve data for each of the adaptation sets identified by the selection data.

2. The method of claim 1, wherein the streaming client is configured to retrieve the data for each of the adaptation sets identified by the selection data according to a streaming protocol defining a first data format, and wherein the availability data is formatted according to a second data format that is different than the first data format defined by the streaming protocol.

3. The method of claim 2, wherein the streaming protocol comprises Dynamic Adaptive Streaming over HTTP (DASH), wherein the first data format comprises one of ISO Base Media File Format (ISO BMFF), an extension to the ISO BMFF, or MPEG-2 Transport Stream (MPEG-2 TS), and wherein the second data format comprises MPEG-H 3D Audio.

4. The method of claim 1, further comprising receiving quality data representative of a relative quality for at least one of the adaptation sets that is to be retrieved, wherein providing the instruction data comprises forming the instruction data to cause the streaming client to retrieve a representation of the at least one of the adaptation sets that corresponds to the relative quality.

5. The method of claim 4, wherein receiving the quality data comprises receiving a relative volume for the at least one of the adaptation sets, the method further comprising, in response to determining that the relative volume for the at least one of the adaptation sets is higher than relative volumes for other adaptation sets identified by the selection data, forming the instruction data to cause the streaming client to retrieve a representation of the at least one adaptation set that has a relatively higher bitrate than bitrates for representations of the other adaptation sets identified by the selection data.

6. The method of claim 1, further comprising retrieving, by the streaming client, data for each of the available adaptation sets before receiving the instruction data.

7. The method of claim 6, further comprising, in response to the instruction data, by the streaming client:
 determining at least one of the available adaptation sets that is not to be retrieved;
 determining an amount of bandwidth that was allocated to the at least one of the available adaptation sets prior to receiving the instruction data;
 allocating the determined amount of bandwidth to one or more of the adaptation sets to be retrieved according to the instruction data; and
 adjusting representation selections for one or more of the adaptation sets to be retrieved based on the allocated amount of bandwidth.

8. The method of claim 1, further comprising receiving, by the streaming client, a manifest file including the availability data.

9. The method of claim 8, wherein the manifest file comprises a media presentation description (MPD).

10. The method of claim 1, wherein receiving the availability data comprises receiving the availability data from the streaming client.

11. The method of claim 1, wherein receiving the selection data comprises receiving the selection data from a user interface.

12. The method of claim 1, wherein providing the instruction data comprises providing the instruction data to cause the streaming client to only retrieve data for the adaptation sets identified by the selection data and to prevent retrieval of any data for adaptation sets that are not identified by the selection data.

13. The method of claim 1, wherein providing the instruction data comprises providing the instruction data to cause the streaming client to perform bandwidth adaptation for the adaptation sets identified by the selection data, and to retrieve data from representations having lowest available bitrates of the available adaptation sets that are not identified by the selection data.

14. The method of claim 1, further comprising forming the instruction data to identify representations to be retrieved for each of the adaptation sets identified by the selection data.

15. The method of claim 1, further comprising sending, by the streaming client, respective HTTP GET or partial GET requests to retrieve data in accordance with the instruction data.

16. The method of claim 1, wherein the streaming client comprises a Dynamic Adaptive Streaming over HTTP (DASH) client.

17. The method of claim 1, wherein the streaming client is included in a middleware unit that further includes a broadcast or multicast reception unit and a proxy server, the method further comprising retrieving, by the streaming client, cached media data in accordance with the instruction data via unicast from the proxy server.

18. A device for retrieving audio data, the device comprising:
 one or more processors configured to:
  receive availability data representative of a plurality of available adaptation sets, the available adaptation sets including one or more scene-based audio adaptation sets and one or more object-based audio adaptation sets, the object-based audio adaptation sets including audio data for audio objects and metadata representing location coordinates for the audio objects, and the one or more scene-based audio adaptation sets including audio data representing a soundfield using spherical harmonic coefficients and comprising one or more scalable audio adaptation sets, each of the one or more scalable audio adaptation sets corresponding to respective layers of scalable audio data;
  receive selection data identifying which of the scene-based audio adaptation sets and the one or more object-based audio adaptation sets are to be retrieved; and
  provide instruction data to a streaming client to cause the streaming client to retrieve data for each of the adaptation sets identified by the selection data; and
 a memory configured to store the retrieved data for the audio adaptation sets.

19. The device of claim 18, wherein the streaming client comprises a Dynamic Adaptive Streaming over HTTP (DASH) client configured to send requests for media data, including header data, to a server device.

20. The device of claim 19, wherein the DASH client is configured to receive the media data, including the header data, from the server device.

21. The device of claim 18, wherein the streaming client is configured to retrieve the data for each of the adaptation sets identified by the selection data according to a streaming protocol defining a first data format, and wherein the availability data is formatted according to a second data format that is different than the first data format defined by the streaming protocol.

22. The device of claim 18, further comprising a user interface configured to receive user-provided selection data based on a user-defined action and to provide the selection data to the one or more processors.

23. The device of claim 18, further comprising an MPEG-H (Moving Pictures Experts Group) Audio decoder configured to decode at least one of scene-based audio data, channel-based audio data, or object-based audio data.

24. The device of claim 18, wherein the one or more processors comprise an MPEG-H audio decoder.

25. The device of claim 18, wherein the one or more processors comprise a metadata processing unit of an MPEG-H audio decoder.

26. The device of claim 18, further comprising an MPEG-H audio decoder, wherein the one or more processors comprise a metadata processing unit separate from the MPEG-H audio decoder.

27. A device for retrieving audio data, the device comprising:
 means for receiving availability data representative of a plurality of available adaptation sets, the available adaptation sets including one or more scene-based audio adaptation sets and one or more object-based audio adaptation sets, the object-based audio adaptation sets including audio data for audio objects and metadata representing location coordinates for the audio objects, and the one or more scene-based audio adaptation sets including audio data representing a soundfield using spherical harmonic coefficients and comprising one or more scalable audio adaptation sets, each of the plurality of scalable audio adaptation sets corresponding to respective layers of scalable audio data;

means for receiving selection data identifying which of the scene-based audio adaptation sets and the one or more object-based audio adaptation sets are to be retrieved; and means for providing instruction data to a streaming client to cause the streaming client to retrieve data for each of the adaptation sets identified by the selection data.

28. The device of claim 27, wherein the streaming client is configured to retrieve the data for each of the adaptation sets identified by the selection data according to a streaming protocol defining a first data format, and wherein the availability data is formatted according to a second data format that is different than the first data format defined by the streaming protocol.

29. The device of claim 27, wherein the means for receiving the selection data comprises means for receiving the selection data from a user interface.

30. The device of claim 27, wherein the means for providing the instruction data comprises means for providing the instruction data to cause the streaming client to only retrieve data for the adaptation sets identified by the selection data and to prevent retrieval of any data for adaptation sets that are not identified by the selection data.

31. The device of claim 27, wherein the streaming client comprises a Dynamic Adaptive Streaming over HTTP (DASH) client configured to send requests for media data, including header data, to a server device.

32. A non-transitory computer-readable storage medium having stored thereon instructions that, when executed, cause a processor to:

receive availability data representative of a plurality of available adaptation sets, the available adaptation sets including one or more scene-based audio adaptation sets and one or more object-based audio adaptation sets, the object-based audio adaptation sets including audio data for audio objects and metadata representing location coordinates for the audio objects, and the one or more scene-based audio adaptation sets including audio data representing a soundfield using spherical harmonic coefficients and comprising one or more scalable audio adaptation sets, each of the one or more scalable audio adaptation sets corresponding to respective layers of scalable audio data;

receive selection data identifying which of the scene-based audio adaptation sets and the one or more object-based audio adaptation sets are to be retrieved; and provide instruction data to a streaming client to cause the streaming client to retrieve data for each of the adaptation sets identified by the selection data.

33. The non-transitory computer-readable storage medium of claim 32, wherein the streaming client is configured to retrieve the data for each of the adaptation sets identified by the selection data according to a streaming protocol defining a first data format, and wherein the availability data is formatted according to a second data format that is different than the first data format defined by the streaming protocol.

34. The non-transitory computer-readable storage medium of claim 32, wherein the instructions that cause the processor to receive the selection data comprise instructions that cause the processor to receive the selection data from a user interface.

35. The non-transitory computer-readable storage medium of claim 32, wherein the streaming client comprises a Dynamic Adaptive Streaming over HTTP (DASH) client configured to send requests for media data, including header data, to a server device.

* * * * *